US011336727B2

(12) United States Patent
Walli et al.

(10) Patent No.: US 11,336,727 B2
(45) Date of Patent: May 17, 2022

(54) SPECIALIZED CASING UNIT DETECTION FOR ASSET TRACKING DEVICES

(71) Applicant: Geotab Inc., Oakville (CA)

(72) Inventors: Thomas Arthur Walli, Hamilton (CA); Michael Pirruccio, Oakville (CA); Paul Philip Ciolek, Oakville (CA)

(73) Assignee: Geotab Inc., Oakville (CA)

( * ) Notice: Subject to any disclaimer, the term of this patent is extended or adjusted under 35 U.S.C. 154(b) by 96 days.

(21) Appl. No.: 17/009,479

(22) Filed: Sep. 1, 2020

(65) Prior Publication Data
US 2022/0060542 A1 Feb. 24, 2022

Related U.S. Application Data

(63) Continuation-in-part of application No. 16/996,291, filed on Aug. 18, 2020, now abandoned.

(51) Int. Cl.
*H04L 67/12* (2022.01)
*H04L 12/40* (2006.01)
(Continued)

(52) U.S. Cl.
CPC .......... *H04L 67/12* (2013.01); *G06Q 10/087* (2013.01); *G07C 5/008* (2013.01); *H04L 12/40032* (2013.01); *H04L 2012/40215* (2013.01)

(58) Field of Classification Search
CPC .............. H04L 67/12; H04L 12/40032; H04L 2012/40215; G06Q 10/087; G07C 5/008
See application file for complete search history.

(56) References Cited

U.S. PATENT DOCUMENTS 9,251,628 B2   2/2016  Ubik et al.
2004/0230356 A1  11/2004  Namaky
(Continued)

FOREIGN PATENT DOCUMENTS

GB       2 483 868 A       3/2012

OTHER PUBLICATIONS

U.S. Appl. No. 29/736,543, filed Jun. 9, 2020, Karimi et al.
(Continued)

*Primary Examiner* — Philip J Chea
*Assistant Examiner* — Hassan A Khan
(74) *Attorney, Agent, or Firm* — Wolf, Greenfield & Sacks, P.C.

(57) ABSTRACT

Systems, devices, and methods for asset tracking through specialized connectors and specialized casing units are provided. An example system includes an asset tracking device and a specialized casing unit to house the asset tracking device and to connect the asset tracking device to a communication port of an asset. The asset tracking device includes a communication port interface to interface with the communication port of the asset directly, and to interface with the communication port of the asset through the specialized casing unit. The asset tracking device further includes a controller to determine whether the asset tracking device is interfaced with the communication port of the asset directly or through the specialized casing unit, and when it is determined that the asset tracking device is interfaced with the communication port of the asset through the specialized casing unit, configure the asset tracking device to operate in a specialized operating mode.

19 Claims, 12 Drawing Sheets

(51) Int. Cl.
*G06Q 10/08* (2012.01)
*G07C 5/00* (2006.01)

(56) References Cited

U.S. PATENT DOCUMENTS

| | | | |
|---|---|---|---|
| 2014/0019000 A1* | 1/2014 | Ruther | G01M 17/007 |
| | | | 701/31.4 |
| 2016/0013598 A1 | 1/2016 | Kirkpatrick et al. | |
| 2016/0110929 A1 | 4/2016 | Park | |
| 2016/0370202 A1 | 12/2016 | James et al. | |
| 2017/0046048 A1* | 2/2017 | Marshall | H04W 4/80 |
| 2017/0240126 A1 | 8/2017 | Kang et al. | |
| 2018/0151003 A1* | 5/2018 | Grobler | G06F 16/90335 |
| 2020/0160627 A1* | 5/2020 | Jeong | G07C 5/0808 |
| 2020/0302547 A1* | 9/2020 | Konrardy | G07C 5/008 |

OTHER PUBLICATIONS

Karimi et al., Case for Electronic Communication Device. Co-pending U.S. Appl. No. 29/736,543, filed Jun. 1, 2020.
Walli, When is a Go Rugged Device Required? Geotab. Nov. 6, 2018, 11 pages.
Extended European Search Report for European Application No. 21185723.0, dated Jan. 20, 2022.

\* cited by examiner

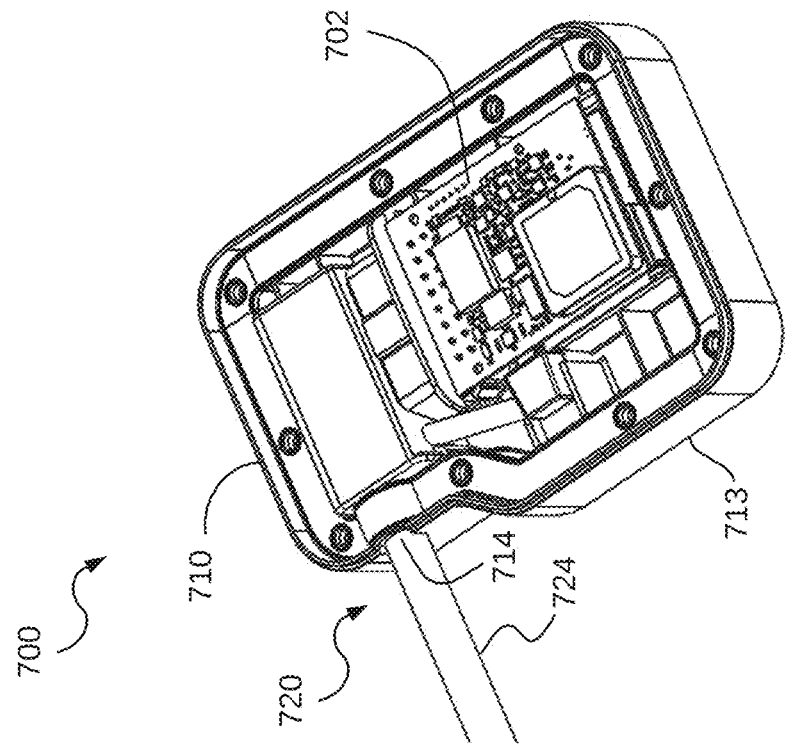
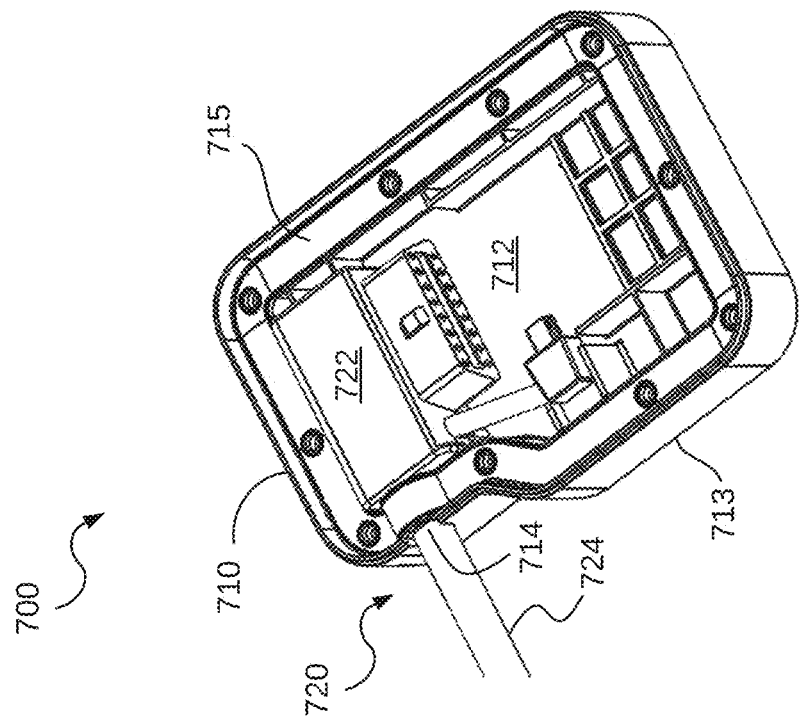
FIG. 7B
FIG. 7A

SPECIALIZED CASING UNIT DETECTION FOR ASSET TRACKING DEVICES

CROSS-REFERENCE TO RELATED APPLICATIONS

This application is a continuation-in-part of U.S. application Ser. No. 16/996,291, filed Aug. 18, 2020, titled "Specialized Casing Unit Detection for Asset Tracking Device", which is incorporated by reference in its entirety.

FIELD

The present disclosure relates to telematics, and in particular to asset tracking devices and peripherals for asset tracking devices.

BACKGROUND

A telematics system may track the location of an asset, such as a vehicle, and other data related to the asset, through an asset tracking device located onboard the asset. An asset tracking device may communicate with a satellite navigation system, such as a Global Positioning System (GPS), Global Navigation Satellite System (GNSS), cellular tower network, Wi-Fi network, or other system to track the location of the asset. The asset tracking device may collect additional information via sensors on the asset tracking device, such as accelerometer data or other data. An asset tracking device may also collect information through a data connection with the asset itself, such as, in the case of a vehicular asset, through an onboard diagnostic port from which engine speed, battery temperature, fuel level, tire pressure, outside temperature, or other asset data may be obtained. Such data may be transmitted to a telematics system where it is recorded and used in the provision of telematics services, such as fleet management tools, or for further data analysis.

SUMMARY

According to an aspect of the disclosure, a system for asset tracking through a specialized casing unit is provided. The system includes an asset tracking device and a specialized casing unit to house the asset tracking device and to connect the asset tracking device to a communication port of an asset. The asset tracking device includes a communication port interface to interface with the communication port of the asset directly, and interface with the communication port of the asset through the specialized casing unit. The asset tracking device further includes a controller to determine whether the asset tracking device is interfaced with the communication port of the asset directly or through the specialized casing unit, and when it is determined that the asset tracking device is interfaced with the communication port of the asset through the specialized casing unit, configure the asset tracking device to operate in a specialized operating mode.

The controller may determine whether the asset tracking device is interfaced with the communication port of the asset directly or through the specialized casing unit by detecting an identifying characteristic of the specialized casing unit. The specialized casing unit may include a communication port connector to connect the asset tracking device to the communication port of the asset. The communication port connector may include an asset tracking device-connecting portion to interface with the communication port interface of the asset tracking device, an asset-connecting portion to interface with the communication port of the asset, and a cable to connect the asset tracking device-connecting portion to the asset-connecting portion. The specialized casing unit may further include a casing to house the asset tracking device and the asset tracking device-connecting portion of the communication port connector with the cable and the asset-connecting portion free to connect to the communication port of the asset.

The casing may be waterproof. The asset tracking device-connecting portion of the communication port connector may match a form factor and connection pin arrangement of the communication port of the asset. The casing may include a tray that defines an interior space to store the asset tracking device and the asset tracking device-connecting portion of the communication port connector, the tray including a sealable opening to allow the cable of the communication port connector to pass therethrough, and a cover that fits over the tray and is mountable to the asset, the cover to close the interior space of the tray and seal the sealable opening of the tray when fit over the tray and mounted to the asset, the cover including a cable routing tunnel that extends past a perimeter of the tray and overhangs an area of the asset in a vicinity of the sealable opening to at least partially conceal the cable as it passes through the sealable opening, the cable routing tunnel further to at least partially conceal the cable as it passes from the sealable opening into the asset through a hole in the asset located beneath the cable routing tunnel.

The controller may determine whether the asset tracking device is interfaced with the communication port of the asset directly or through the specialized casing unit by detecting an identifying characteristic of the asset tracking device-connecting portion of the communication port connector. The identifying characteristic of the asset tracking device-connecting portion of the communication port connector may be the characteristic that two connection pins of the asset tracking device-connecting portion of the communication port connector are shorted together.

The asset tracking device may include an expansion port, and the asset tracking device-connecting portion of the communication port connector may include a communication port interface connector to interface with the communication port interface of the asset tracking device, and an expansion port connector to interface with the expansion port of the asset tracking device. The identifying characteristic of the asset tracking device-connecting portion of the communication port connector may be the characteristic that one or more connection pins of the expansion port connector are shorted to one or more connection pins of the communication port interface connector.

The controller may configure the asset tracking device to operate in the specialized operating mode by one or more of: disabling a tracking feature that is to be disabled when the asset tracking device is housed in the specialized casing unit, and enabling a tracking feature that is to be enabled when the asset tracking device is housed in the specialized casing unit, modifying a tracking feature that is to be modified when the asset tracking device is housed in the specialized casing unit, and setting a communication parameter that is to be set when the asset tracking device is housed in the specialized casing unit.

The system may include an asset tracking device testing apparatus to interface with the asset tracking device, cooperate with the asset tracking device to determine whether the asset tracking device is interfaced with the asset tracking device testing apparatus directly or through the specialized casing unit, and when it is determined that the asset tracking device is interfaced with the asset tracking device testing apparatus through the specialized casing unit, cause the asset tracking device to store an indication that the asset tracking device is to operate in the specialized operating mode. The controller of the asset tracking device may determine whether the asset tracking device is interfaced with the communication port of the asset directly or through the specialized casing unit by the asset tracking device determining, during a bootup sequence, whether the indication that the asset tracking device is to operate in the specialized operating mode is stored on the asset tracking device.

According to another aspect of the disclosure, an asset tracking device capable of asset tracking through a specialized casing unit is provided. The asset tracking device includes an interface layer to collect data through a communication port of an asset, and a controller to determine whether the asset tracking device is housed in a specialized casing unit, the specialized casing unit including a communication port connector to connect the interface layer of the asset tracking device to the communication port of the asset, and when it is determined that the asset tracking device is housed in the specialized casing unit, configure the asset tracking device to operate in a specialized operating mode. The asset tracking device further includes a network interface to transmit the data collected through the interface layer to a server.

The controller of the asset tracking device may determine whether the asset tracking device is housed in the specialized casing unit by detecting a hardware configuration of the specialized casing unit. The asset tracking device may include a communication port interface to interface with the communication port of the asset directly and to interface with the communication port of the asset through the specialized casing unit, and an expansion port. The hardware configuration of the specialized casing unit may be a shorted connection between the communication port interface of the asset tracking device and the expansion port of the asset tracking device.

The controller of the asset tracking device may determine whether the asset tracking device is housed in the specialized casing unit by determining whether an indication that the asset tracking device is to operate in the specialized operating mode is stored on the asset tracking device. The controller may configure the asset tracking device to operate in the specialized operating mode by one or more of: disabling a tracking feature that is to be disabled when the asset tracking device is housed in the specialized casing unit, enabling a tracking feature that is to be enabled when the asset tracking device is housed in the specialized casing unit, modifying a tracking feature that is to be modified when the asset tracking device is housed in the specialized casing unit, and setting a communication parameter that is to be set when the asset tracking device is housed in the specialized casing unit.

According to yet another aspect of the disclosure, a method for asset tracking is provided. The method involves interfacing an asset tracking device with a control unit, determining whether the asset tracking device is interfaced with the control unit directly or through a specialized casing unit, and when it is determined that the asset tracking device is interfaced with the control unit through the specialized casing unit, configuring the asset tracking device to operate in a specialized operating mode.

The control unit may include an electronic control unit of an asset. The control unit may include an asset tracking device testing apparatus, and determining whether the asset tracking device is interfaced with the control unit directly or through a specialized casing unit may involve the asset tracking device testing apparatus cooperating with the asset tracking device. Configuring the asset tracking device to operate in the specialized operating mode may involve the asset tracking device testing apparatus transmitting a command to the asset tracking device to store an indication that the asset tracking device is to operate in the specialized operating mode, the asset tracking device initializing a bootup sequence, the asset tracking device detecting, during the bootup sequence, the indication that the asset tracking device is to operate in the specialized operating mode, and the asset tracking device configuring itself to operate in the specialized operating mode.

A specialized tracking feature may be enabled in the specialized operating mode. The method may further involve the asset tracking device collecting specialized data in accordance with the specialized tracking feature, and the asset tracking device transmitting the specialized data to a server.

BRIEF DESCRIPTION OF THE DRAWINGS

FIG. 7A is a perspective view of an example specialized casing unit for an asset tracking device with its cover removed to show the interior of the specialized casing unit.

FIG. 7B is a perspective view of the specialized casing unit of FIG. 7A with an asset tracking device housed therein.

DETAILED DESCRIPTION

Figure 1:
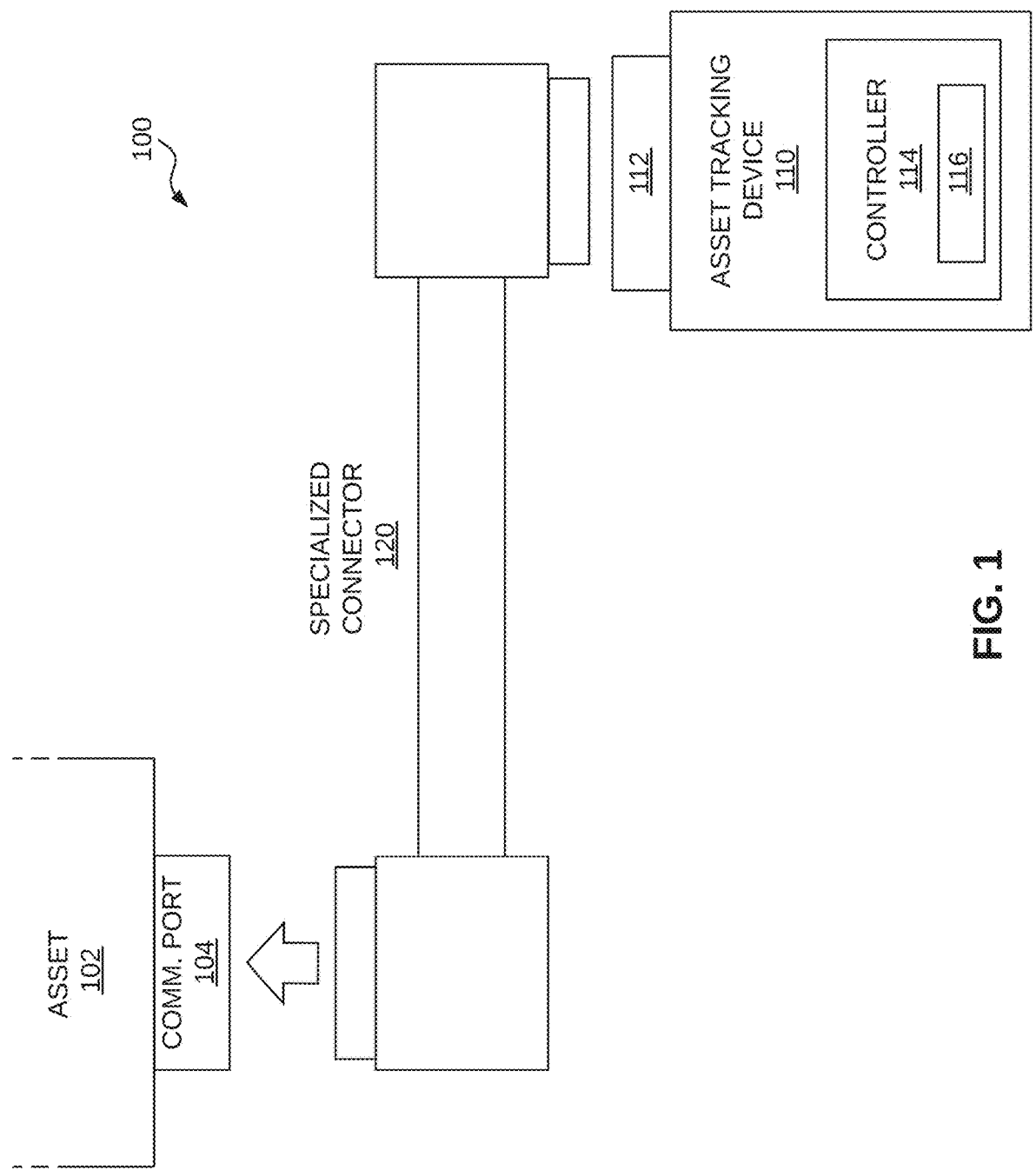
FIG. 1 is a schematic diagram of an example system for asset tracking through a specialized connector that modifies operation of an asset tracking device.

An asset tracking device may collect data from an asset through a communication port of the asset. An asset tracking device may therefore include a communication port interface that allows the asset tracking device to physically couple and directly connect to such a communication port. Such a communication port may be, for example, an onboard diagnostic (OBD) port used to communicate with an electronic control unit (e.g., engine control unit) of the asset. Examples of assets that include such OBD ports to which an asset tracking device may be connected include passenger vehicles, transport trucks, construction equipment, electricity generators, and other assets.

However, it may not be practical to directly connect an asset tracking device to the communication port of an asset in certain applications. For example, in the case where the asset is a construction vehicle, the communication port of the construction vehicle may be located in a place where the large metal chassis and other parts of the construction vehicle interfere with sensors and/or the ability of the asset tracking device to access telecommunications networks. As another example, the communication port may be located in an unstable location or in a place that is prone to being inadvertently dislodged by an operator of the asset. As yet another example, the communication port may be located in a place that is exposed to harsh environmental conditions (e.g., heat, sand, water). In such cases, the asset tracking device may be connected to the communication port through a connection cable (e.g., a harness), and may be mounted or stored in a more suitable location in or on the asset.

As described herein, an asset tracking device may be connected to a communication port of an asset through a specialized connector or casing unit that allows the asset tracking device to connect to the communication port from a safer, more accessible, more convenient, or otherwise more desirable location. When in a specialized casing unit, the casing may be mounted at a location inside or outside the asset that improves the reception and transmission capabilities of the asset tracking device, that is less prone to being dislodged, or that is otherwise more safe, convenient, or effective. The specialized casing unit may be ruggedized in that it may be resistant to water, debris, or other hazards, to protect the asset tracking device.

Further, as described herein, an asset tracking device is configured to detect whether it is interfaced with the communication port of an asset directly or through a specialized connector or casing unit. When connected through a specialized connector or casing unit, the asset tracking device reconfigures itself to operate in a specialized operating mode. For example, when placed in a ruggedized casing unit that is designed to be mounted on the exterior of a piece of construction equipment for improved network connectivity, the asset tracking device may operate in a ruggedized operating mode in which it is configured to track data that is relevant to the construction equipment (e.g., detecting arm position of an excavator, monitoring diesel particular filter), and further, may cease tracking data that is not relevant to the construction equipment (e.g., detecting passenger seat-belt status). In some applications, by swapping out certain tracking capabilities for others when in specialized operation modes, the asset tracking device may save on code space, and may be designed for multifunctional operation with a smaller working memory than would otherwise be required if all of its tracking capabilities were enabled at the same time.

FIG. 1 is a schematic diagram of an example system 100 for asset tracking through a specialized connector 120 that modifies operation of an asset tracking device 110. The system 100 includes the asset tracking device 110, which is to interface with a communication port 104 of an asset 102 and to collect data through the communication port 104. The asset tracking device 110 includes a communication port interface 112 to interface with the communication port 104 of the asset 102 directly, or in other words, to physically couple and directly connect to the communication port 104, to allow the asset tracking device 110 to collect data through the communication port 104. The communication port 104 may include an onboard diagnostic (OBD) port, and the asset tracking device 110 may communicate directly with an electronic control unit of the asset 102 to collect such data through the OBD port. When the asset 102 is a vehicle, such an electronic control unit may be an engine control unit or another electronic control unit which communicates over a Controlled Area Network (CAN) bus, and the communication port 104 may be an OBD2 port or similar.

The asset tracking device 110 may also collect data through additional sensors onboard the asset tracking device 110 (not shown), such as an accelerometer, temperature sensor, or other sensor, and may track the location of the asset 102 using a location tracking device, such as a Global Positioning System (GPS) module, Global Navigation Satellite System (GNSS) module, or similar.

The system 100 further includes the specialized connector 120, with which the communication port interface 112 is to interface with the communication port 104 of the asset 102. The specialized connector 120 includes a portion for the communication port interface 112 of the asset tracking device 110 to connect to that matches a form factor and connection pin arrangement of the communication port 104 of the asset 102. That is, the specialized connector 120 includes a connection pin that corresponds to each connection pin of the communication port 104 of the asset 102. For example, where the communication port 104 includes a 16 pin OBD port, the communication port interface 112 may include pins for a 16 pin connector to mate with an OBD port. Thus, the communication port interface 112 may be optionally or interchangeably interfaced with the communication port 104 either directly or through the specialized connector 120.

The asset tracking device 110 includes a controller 114 (i.e., a combination of processor and memory) that stores and executes specialized connector detection and reconfiguration instructions 116. These instructions 116 cause the controller 114 to determine whether the asset tracking device 110 is interfaced with the communication port 104 of the asset 102 directly or through the specialized connector 120. In other words, the instructions 116 cause the controller 114 to determine whether the asset tracking device 110 is to operate in a specialized operating mode. Once this is determined, the instructions 116 cause the controller 114 to configure the asset tracking device 110 to operate in the specialized (or alternative, e.g. "ruggedized") operating mode. The specialized operating mode may be specialized according to the particular type of specialized connector 120 to which the asset tracking device 110 is connected.

The controller 114 may determine whether the asset tracking device 110 is interfaced with the communication port 104 of the asset 102 directly or through the specialized connector 120, and is therefore to operate in a specialized operating mode, by detecting an identifying characteristic of the specialized connector 120. In other words, the controller 114 may detect a hardware configuration, or some other detectable characteristic, of the specialized connector 120, that indicates that the asset tracking device 110 is not connected directly to the communication port 104, but rather, through the specialized connector 120.

The identifying characteristic may be, for example, the characteristic that two connection pins of the specialized connector 120 are shorted together. The two pins that are shorted together may be pins that provide connection to the communication port 104 of the asset 102, and may correspond to two pins of the communication port 104 that are not used by the asset 102. Thus, the corresponding connection pins of the specialized connector 120 may be safely repurposed to provide the identifying characteristic that indicates that the asset tracking device 110 is connected to the specialized connector 120.

Since the corresponding pins on the communication port 104 are not used by the asset 102, the corresponding pins on the specialized connector 120 may be shorted together without disrupting communication between the asset tracking device 110 and the asset 102. For example, a particular piece of construction equipment may not use all of the Controlled Area Network (CAN) pin connections or Variable Input/Output Manufacturer (VIOM) pins that its communication port 104 is capable of using, and a specialized connector 120 that is designed for use with that piece of construction equipment may include shorted connections that correspond to a particular combination of such unused pins. Several different combinations of shorted pins may be possible, and thus, several different specialized connectors 120 may be designed with unique combinations of connection pins shorted together for unique identification of the specialized connector 120. Examples of different identifying characteristics, and how such identifying characteristics may be identified, are discussed in greater detail below, in FIG. 4, FIG. 5, and FIG. 6.

Configuring the asset tracking device 110 to operate in the specialized operating mode may involve enabling a tracking feature that is to be enabled when the asset tracking device 110 is interfaced with the communication port 104 of the asset 102 through the specialized connector 120 (i.e., a specialized feature). For example, detection of a specialized connector 120 that is intended to be used for an excavator vehicle may cause the asset tracking device 110 to track arm position of the excavator. As another example, detection of the specialized connector 120 may cause the asset tracking device 110 to enable a proprietary tracking feature that is designed for the particular asset 102 to which the asset tracking device 110 is to be connected.

In some examples, configuring the asset tracking device 110 to operate in the specialized operating mode may involve disabling a tracking feature that is to be disabled when the asset tracking device 110 is interfaced with the communication port 104 of the asset 102 through the specialized connector 120 (i.e., an unnecessary or undesired feature). For example, detection of a specialized connector 120 that is intended to be used for a vehicle that does not have any seatbelts may cause the asset tracking device 110 to cease tracking data seatbelt status.

In some examples, configuring the asset tracking device 110 to operate in the specialized operating mode may involve modifying a tracking feature that is to be modified when the asset tracking device 110 is interfaced with the communication port 104 of the asset 102 through the specialized connector 120. For example, detection of a specialized connector 120 that is intended to be used for a particular type of asset 102 (e.g., sports utility vehicle, all-terrain vehicle (ATV), snowmobile) may cause a particular type of data to be collected in a particular way (e.g., for recreational vehicles, the collection of accelerometer data may be dampened or smoothed), or may modify the way in which a particular type of data causes follow-on actions (e.g., for winter recreational vehicles such as snowmobiles, an engine oil temperature warning may be triggered at a different temperature than in other vehicles). Thus, a tracking feature that runs on the asset tracking device 110 may be modified or tuned according to the type of asset 102 to which the asset tracking device 110 is connected.

In some examples, configuring the asset tracking device 110 to operate in the specialized operating mode may involve setting a communication parameter that is to be set when the asset tracking device 110 is interfaced with the communication port 104 of the asset 102 through the specialized connector (e.g., a particular communication bitrate between the asset tracking device 110 and the asset 102). Thus, a communication parameter may be set to be suitable for communication between the asset tracking device 110 and the asset 102 to which the asset tracking device 110 is to be connected.

Thus, the asset tracking device 110 may collect data from an asset 102 directly through the communication port 104, or, in specialized use cases, through a specialized connector 120 that modifies the operation of the asset tracking device 110.

Figure 2:
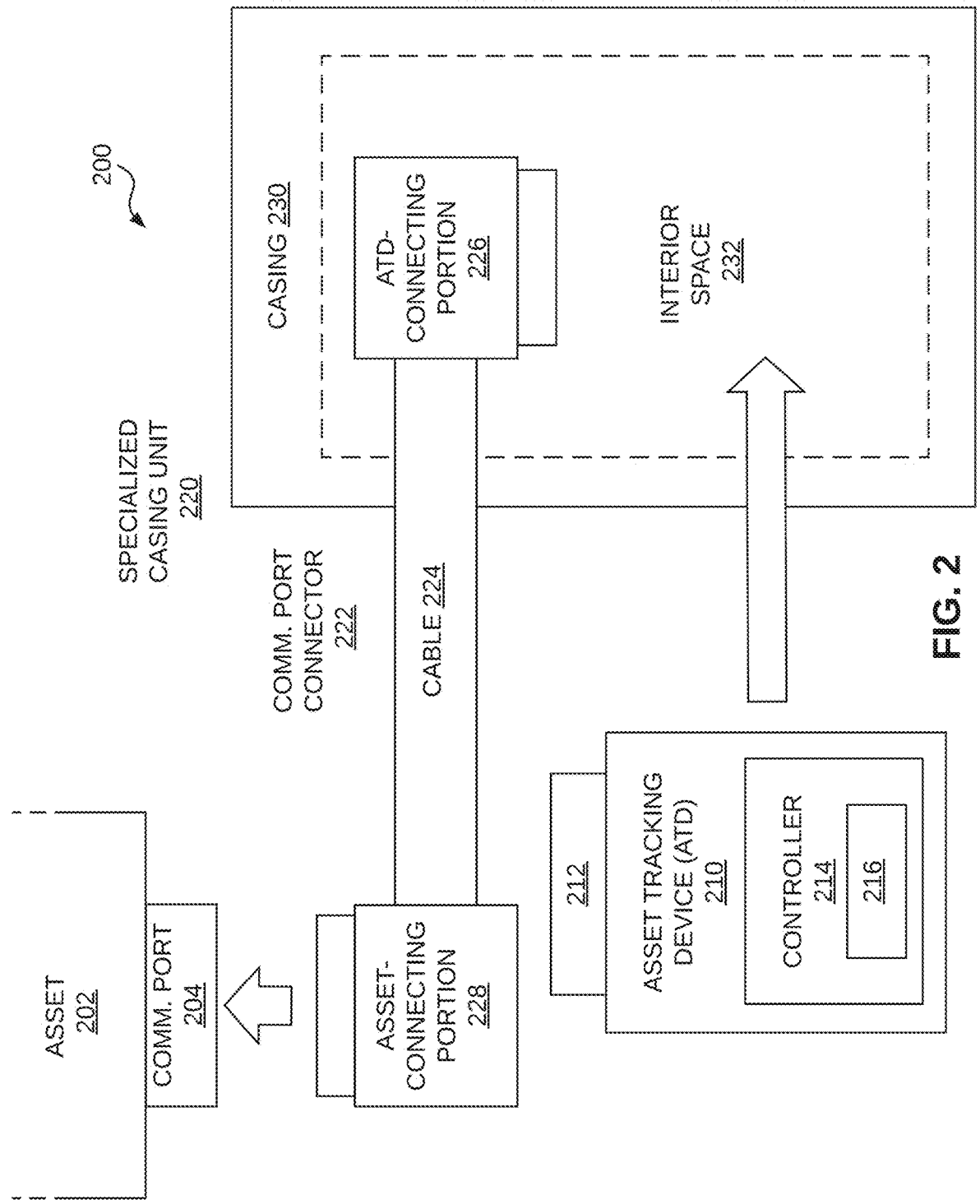
FIG. 2 is a schematic diagram of an example system for asset tracking through a specialized casing unit that modifies operation of an asset tracking device.

FIG. 2 is a schematic diagram of an example system 200 for asset tracking through a specialized casing unit 220 that modifies operation of an asset tracking device 210. The system 200 is similar to the system 100 of FIG. 1, and therefore includes an asset tracking device 210 that is to interface with a communication port 204 of the asset 202. The asset tracking device 210 may be understood to be another example of the asset tracking device 110 of FIG. 1.

However, the system 200 includes a specialized casing unit 220 to house the asset tracking device 210 and to connect the asset tracking device 210 to the communication port 204 of the asset 202. The asset tracking device 210 includes a communication port interface 212 to interface with the communication port 204 of the asset 202 either directly or through the specialized casing unit 220.

The asset tracking device 210 includes a controller 214 (i.e., a combination of processor and memory) that stores and executes specialized casing unit detection and reconfiguration instructions 216. These instructions 216 cause the controller 214 to determine whether the asset tracking device 210 is interfaced with the communication port 204 of the asset 202 directly or through the specialized casing unit 220. In other words, the instructions 216 cause the controller 214 to determine whether the asset tracking device 210 is housed in the specialized casing unit 220, and therefore is to operate in a specialized operating mode. Once this is determined, the instructions 216 cause the controller 214 to configure the asset tracking device 210 to operate in a specialized (or alternative, e.g. "ruggedized") operating mode. The specialized operating mode may be specialized according to the particular type of specialized casing unit 220 through which the asset tracking device 210 is connected.

The controller 214 may determine whether the asset tracking device 210 is interfaced with the communication port 204 of the asset 202 directly or through the specialized casing unit 220 by detecting an identifying characteristic of the specialized casing unit 220, similar to how the asset tracking device 110 detects an identifying characteristic of the specialized connector 120 of FIG. 1 (e.g., connection pins shorted together), by detecting an identifying characteristic of a connector inside the specialized casing unit 220.

The specialized casing unit 220 includes a communication port connector 222 to connect the asset tracking device 210 to the communication port 204 of the asset 202. The communication port connector 222 includes an asset tracking device-connecting portion 226 to interface with the communication port interface 212 of the asset tracking device 210, an asset-connecting portion 228 to interface with the communication port 204 of the asset 202, and a cable 224 to connect the asset tracking device-connecting portion 226 to the asset-connecting portion 228.

The specialized casing unit 220 further includes a casing 230 to house the asset tracking device 210 and further, to house the asset tracking device-connecting portion 226 of the communication port connector 222, with the cable 224 and the asset-connecting portion 228 free to connect to the communication port 204 of the asset 202. Thus, the casing 230 is sized with an interior space 232 that is sufficient to house the asset tracking device 210 and the asset tracking device-connecting portion 226 of the communication port connector 222.

The identifying characteristic of the specialized casing unit 220 that is indicative that the asset tracking device 210 is interfaced with the communication port 204 through the specialized casing unit 220 (i.e., the characteristic that is detected by the controller 214) may be a characteristic of the asset tracking device-connecting portion 226 of the communication port connector 222. That is, for example, the connection pins that are shorted together may be connection pins in the asset tracking device-connecting portion 226 of the communication port connector 222. The asset tracking device-connecting portion 226 matches a form factor and connection pin arrangement of the communication port 204 of the asset 202, and thus, as with the specialized connector 120 of FIG. 1, certain connection pins of the asset tracking device-connecting portion 226 that correspond to unused pins of the communication port 204 may be shorted to provide the indication that the asset tracking device 210 is interfaced through the specialized casing unit 220.

Thus, the specialized casing unit 220 may be understood to include a "specialized connector" similar to the specialized connector 120 of FIG. 1 that causes the asset tracking device 210 to operate in a specialized operating mode. In the system 200, however, the "specialized connector" is integrated with a casing, or at least, partly housed within the casing, to protect both the asset tracking device 210 and the connector. When interfaced through the specialized casing unit 220, the asset tracking device 210 may be protected from hazards such as water (e.g., waterpoof), dust, debris, heat, and other hazards. In such examples, the specialized casing unit 220 may be termed a "ruggedized" casing unit, in that its casing is ruggedized to protect the asset tracking device 210 from the elements. Being housed in a ruggedized casing unit, the asset tracking device 210 may be better suited for certain applications, such as applications in which the asset tracking device 210 is to be located on the exterior of construction equipment or other assets that are subject to adverse hazards which may otherwise affect the operation of the asset tracking device 210 if not protected by a ruggedized casing.

The asset tracking device 210 may be a self-contained unit, in that it may have its own casing, and may be capable of connecting directly to the communication port 204 in certain applications (e.g., in passenger vehicles) without the specialized casing unit 220. However, as described above, the asset tracking device 210 may also be placed in the specialized casing unit 220 and connected to the communication port 204 through the specialized casing unit 220 when in specialized circumstances (e.g., in a construction vehicle).

As with the asset tracking device 110 of FIG. 1, the asset tracking device 210 may be configured, upon detection that it is interfaced with the communication port 204 of the asset 202 through the specialized casing unit 220, to operate in a specialized operating mode, which may involve the enablement, disablement, or modification of certain tracking features, and/or setting particular communication parameters.

Figure 3:
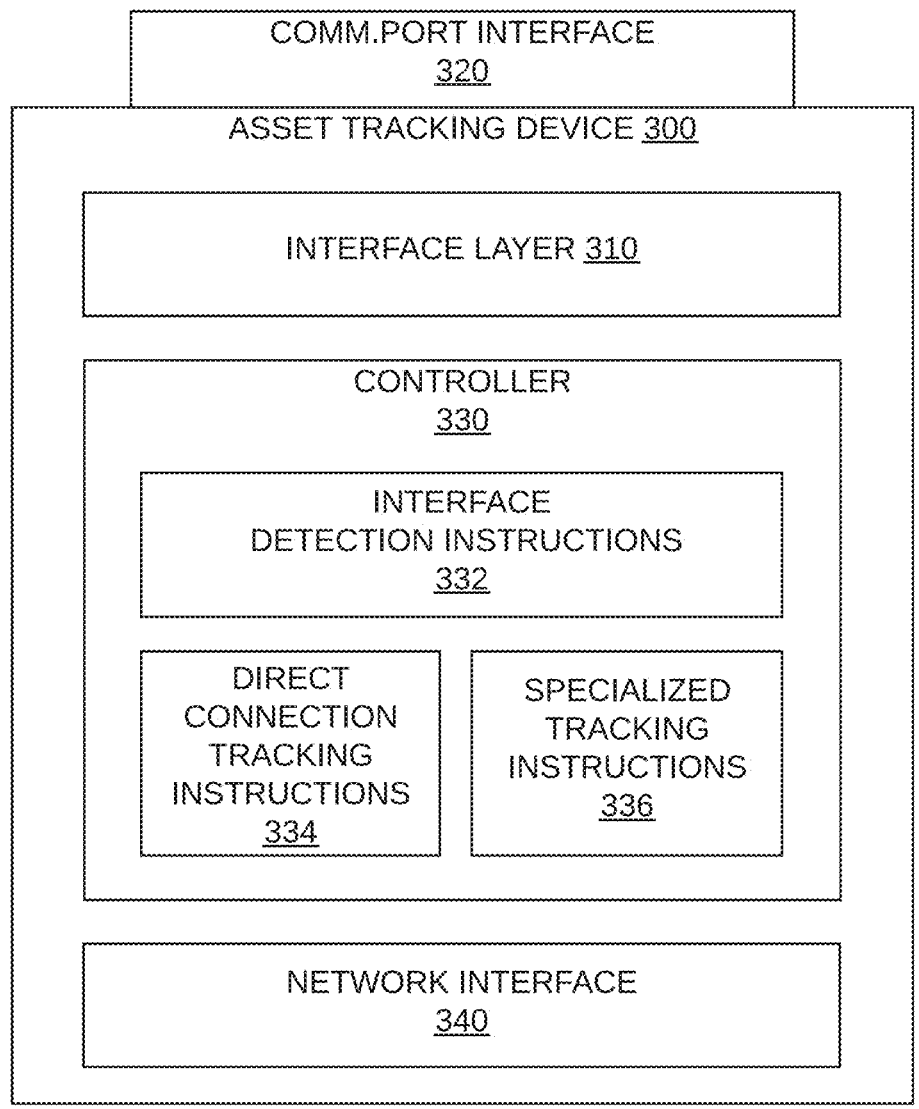
FIG. 3 is a schematic diagram of an example asset tracking device that is operable to interface with a communication port of an asset directly or through a specialized connector or casing unit.

FIG. 3 is a schematic diagram of an example asset tracking device 300. The asset tracking device 300 is operable to interface with a communication port of an asset directly or through a specialized connector or casing unit. Thus, the asset tracking device 300 may be understood to be an example of the asset tracking device 110 of FIG. 1 or the asset tracking device 210 of FIG. 2.

The asset tracking device 300 includes an interface layer 310 to collect data through a communication port of an asset when it is coupled to the communication port through a communication port interface 320. As described herein, the communication port interface 320 may also collect data from a communication port when connected through a specialized connector or specialized casing unit. The interface layer 310 is also to collect data from sensors onboard the asset tracking device 300 (not shown), such as an accelerometer, temperature sensor, GPS, GNSS, or similar.

The asset tracking device 300 further includes a controller 330 operable to execute interface detection instructions 332, direct connection tracking instructions 334, and specialized tracking instructions 336. The controller 330 includes one or more of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 330 as described herein. The controller 330 is operably connected to a memory, which may include ROM, RAM, flash memory, magnetic storage, optical storage, and similar, or any combination thereof, for storing instructions and data as discussed herein, including interface detection instructions 332, direct connection tracking instructions 334, and specialized tracking instructions 336.

The interface detection instructions 332 cause the controller 330 to determine whether the asset tracking device 300 is connected to a communication port of an asset through a specialized connector or specialized casing unit (e.g., by detecting a hardware configuration or other detectable characteristic of the specialized connector or specialized casing unit, as discussed above with reference to FIG. 1 and/or FIG. 2). In other words, in some examples, the interface detection instructions 332 cause the controller 330 to determine whether the asset tracking device is housed in a specialized casing unit (e.g., by detecting a hardware configuration of the specialized casing unit).

The direct connection tracking instructions 334 cause the controller 330 to operate, when it is determined that the asset tracking device 300 is directly interfaced with a communication port of an asset, in a "direct connection" or "normal" operating mode in which a conventional list of tracking features (i.e., tracking features to be enabled when the asset tracking device 300 is directly connected to an asset) are enabled.

The specialized tracking instructions 336 cause the controller 330 to operate, when it is determined that the asset tracking device 300 is interfaced with a communication port of an asset through a specialized connector or specialized casing unit (i.e., housed in a specialized casing unit), in a specialized operating mode in which a specialized list of tracking features (i.e., tracking features to be enabled when the asset tracking device 300 is connected through a specialized connector or specialized casing unit) is enabled and/or a list of redundant tracking features is disabled (i.e., tracking features to be disabled when the asset tracking device 300 is connected through a specialized connector or specialized casing unit), a tracking feature is modified, and/or a communication parameter is set.

The asset tracking device 300 further includes a network interface 340 to transmit the data collected through the interface layer 310 to a server. The server may be part of a telematics system that records data collected from asset tracking devices. The network interface 340 may include a cellular modem, such as an LTE-M modem, CAT-M modem, or other cellular modem configured for bidirectional communication via the network with which asset tracking device 300 communicates with a telematics system.

Figure 4:
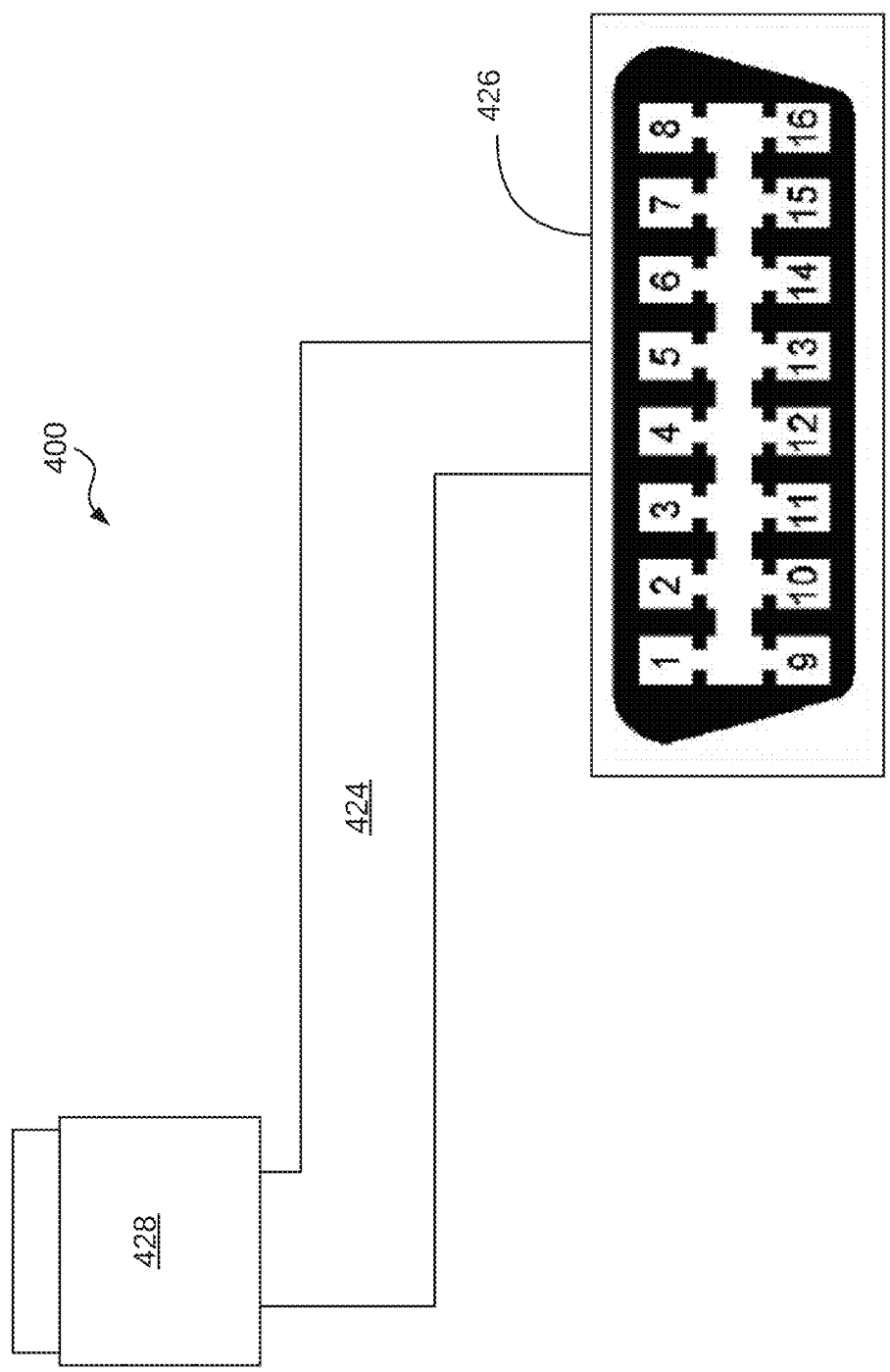
FIG. 4 is a schematic diagram of an example specialized connector that includes an identifying characteristic that can be detected by an asset tracking device.

FIG. 4 is a schematic diagram of an example specialized connector 400 that includes an identifying characteristic that can be detected by an asset tracking device. The specialized connector 400 may be understood to be one example of the specialized connector 120 of FIG. 1 or the communication port connector 222 of FIG. 2.

The specialized connector 400 includes an asset tracking device-connecting portion 426 to interface with the communication port interface of an asset tracking device, an asset-connecting portion 428 to interface with the communication port of the asset, and a cable 424 to connect the asset tracking device-connecting portion 426 to the asset-connecting portion 428. In the present example, the specialized connector 400 is to interface with a 12 pin communication port of an asset, such as a communication port that operates under the Society of Automotive Engineers (SAE) J1939-73 standard, common among heavy- and light-duty utility vehicles, through its asset-connecting portion 428 (i.e, an adaptor). However, the asset tracking device-connecting portion 426 includes connection pins numbered 1 through 16 to interface with an 16-pin asset tracking device. Thus, the specialized connector 400 maps the 16-pin configuration of the asset tracking device to a 12-pin configuration to enable the asset tracking device to communicate with such assets.

The connection pins numbered 1 through 16 of the asset tracking device may be designated, for example, as set out in the following Table 1. Table 1 also shows the mapping of the example 16-pin configuration (i.e., the "internal" pin configuration) to an example 12-pin configuration (i.e., the "external" pin configuration). As can be seen below, some of the pins in the external 12-pin configuration may be used to pass through communication directly between the asset and the asset tracking device, whereas other pins may be used to identify whether the asset tracking device is connected to the asset through a specialized connector or specialized casing unit. The following pin configurations and mappings are provided for exemplary purposes only, and may vary based on the communication protocol to be followed by the asset tracking device, the asset, and/or proprietary configurations.

| Internal Pin # | Internal Pin Designation | External Pin # | External Pin Designation |
|---|---|---|---|
| 1 | Single-wire CAN | not exposed | N/A |
| 2 | J1850 Bus Positive/ J1708 Negative/ Tertiary CAN Low | 9 | J1850 Bus Positive/ J1708 Negative/ Tertiary CAN Low |
| 3 | Secondary CAN High | not exposed | Specialized Casing Unit Detection |
| 4 | Chassis Ground | 1 | Chassis Ground |
| 5 | Signal Ground | not exposed | N/A |
| 6 | Main CAN High/ TTL CAN High | 11 | Main CAN High/ TTL CAN High |
| 7 | ISO K Line | 10 | ISO K Line |
| 8 | VIOM 1 | 8 | VIOM 1 / Specialized Connector ID |
| 9 | VIOM 2 | 5 | VIOM 2 / Specialized Connector ID |
| 10 | J1850 Bus Negative/ J1708 Positive / CAN High | 4 | J1850 Bus Negative/ J1708 Positive / CAN High |
| 11 | Secondary CAN Low | not exposed | Specialized Casing Unit Detection |
| 12 | VIOM 3 | 7 | VIOM 3 / Specialized Connector ID |
| 13 | VIOM 4 | 6 | VIOM 4 / Specialized Connector ID |
| 14 | Main CAN Low/ TTL CAN Low | 2 | Main CAN Low/ TTL CAN Low |
| 15 | ISO L Line | 3 | ISO L Line |
| 16 | Battery | 12 | Battery |

As can be seen in Table 1 above, pins 1, 3, 5, and 11 in the 16-pin configuration are not exposed in the external 12-pin configuration. In the present example, pins 3 and 11 in the internal 16-pin configuration are used to determine whether the asset tracking device is connected through a specialized casing unit. These pins may indicate that the asset tracking device is connected through a specialized casing unit due to a feature of the specialized casing unit that shorts these two pins together. Thus, in other words, the asset tracking device-connecting portion 426 has an identifying characteristic in that two or more of these connection pins (e.g., pins 3 and 11) are shorted together. The two connection pins may be shorted together directly in the asset tracking device-connecting portion 426, or through other components of the specialized connector 400.

Further, the two connection pins that are shorted together may correspond to two pins of the communication port that are not used by the asset to which the specialized connector 400 is intended to be connected. As shown in Table 1 above, pins 3 and 11 are not exposed in the 12-pin configuration. The corresponding pins in the 16-pin configuration may not be used for communication purposes, which may be because the asset to which the specialized connector 400 is connected need not make use of such pins. Thus, these connection pins may be safely repurposed to provide the identifying characteristic of the specialized connector 400. In a more generalized example, a particular asset may not use all of the CAN pin connections or VIOM (Variable Input/Output Manufacturer) pin connections that the specialized connector 400 can accommodate, and any of these unused connections may be shorted together in a uniquely identifying way.

Further, in some examples, any of these unused connections may be shorted together with a bidirectional communication line. (e.g., the ISO K line (pin 7) or the ISO L line (pin 15), through which toggle signals may be transmitted to determine which, if any, of the unused connections are shorted together. In the present example shown in Table 1, pins 8, 9, 12, and 13, in the 16-pin configuration, which correspond to VIOM pins, may be used for such a purpose. In the example shown, any of these VIOM lines (pins 8, 9, 12, or 13) may be shorted to the ISO K line (pin 7), the ISO L line (pin 15), or neither, resulting in 80 possible unique combinations, excluding the case where none of the VIOM lines are shorted, which may be the case where the asset tracking device is connected directly to the OBD port of the asset.

The combination of shorts between VIOM lines and/or ISO K and/or ISO L lines may be mapped to a binary code which provides a unique identification number for each specialized connector 400 that is identified in this way. For example, each type of short may be mapped to a bit in an 8-bit binary sequence according to the following Table 2.

| Bit | Short Type |
| --- | --- |
| 1 (least significant) | Short between pin 8 (VIOM 1) and K line |
| 2 | Short between pin 9 (VIOM 2) and K line |
| 3 | Short between pin 12 (VIOM 3) and K line |
| 4 | Short between pin 13 (VIOM 4) and K line |
| 5 | Short between pin 8 (VIOM 1) and L line |
| 6 | Short between pin 9 (VIOM 2) and L line |
| 7 | Short between pin 12 (VIOM 3) and L line |
| 8 | Short between pin 13 (VIOM 4) and L line |

Following the example bit mapping set out in Table 2, for example, a specialized connector 400 with pins 8 and 9 shorted to the K line and pins 12 and 13 shorted to the L line would have a binary ID of 11000011, or a decimal ID of 195, or a hexadecimal ID of C3.

The ID detection process may follow through a series of steps that involve transmitting toggle signals through the K and L lines and reading the VIOM lines for a corresponding shorted signal. For example, the process may involve selecting a first unused connection pin (e.g., the first VIOM pin) for listening, driving the K line low, driving the K line high, and reading the first unused connection pin between toggles, leaving sufficient time between toggles to allow the circuitry to settle, determining whether the high and low signals send through the K line were detected through the first unused connection pin, and repeating these steps for the other unused connection pins (e.g., the remaining VIOM pins) and the L line.

Thus, several different combinations of shorted pins may be used to uniquely identify specialized connectors 400 through which an asset tracking device may be interfaced. Several different specialized connectors 400 may be designed with unique combinations of connection pins shorted together for unique identification.

Figure 5:
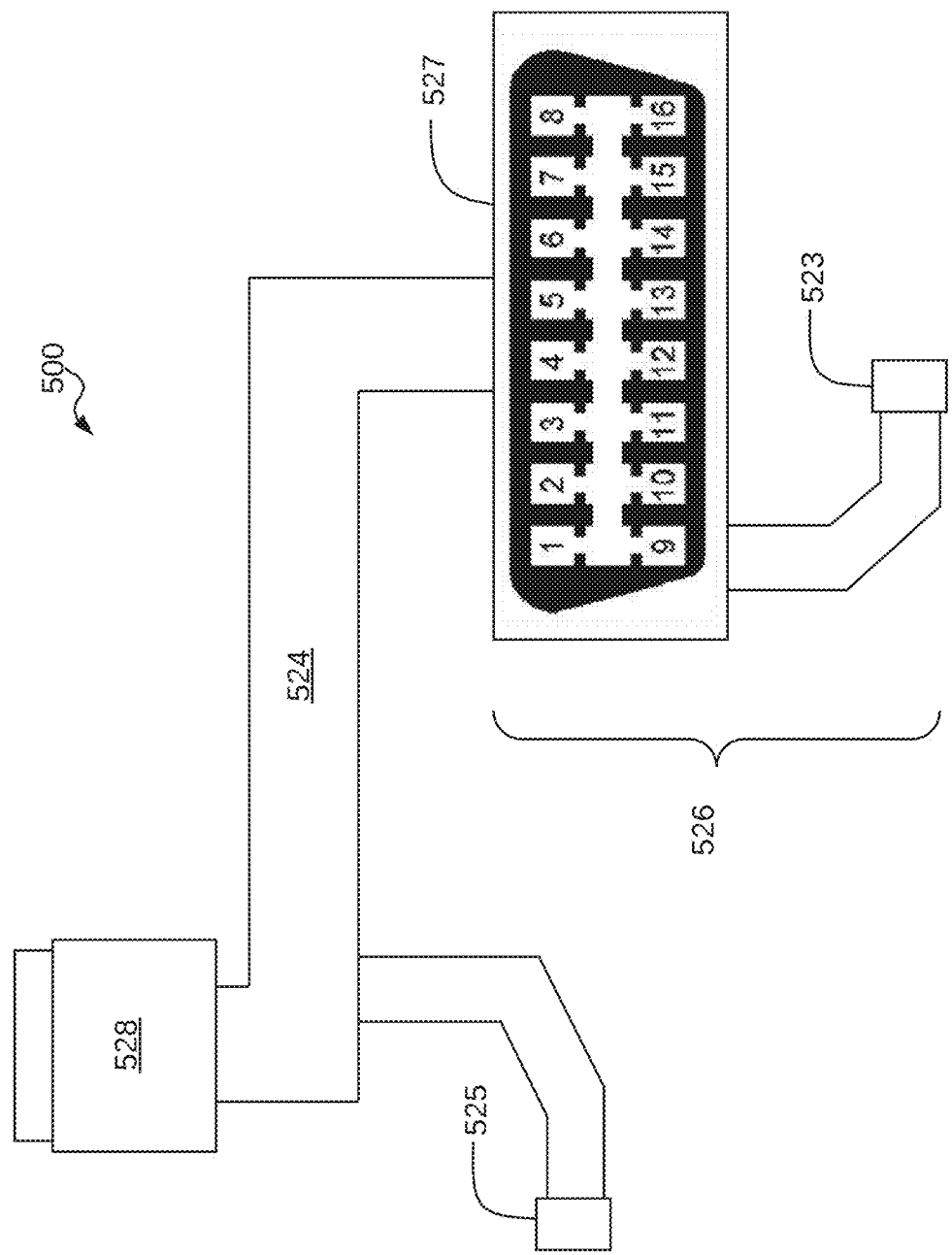
FIG. 5 is a schematic diagram of another example specialized connector that includes an identifying characteristic that can be detected by an asset tracking device.

FIG. 5 is a schematic diagram of another example specialized connector 500 that includes an identifying characteristic that can be detected by an asset tracking device. The specialized connector 500 may be similar to the specialized connector 400 of FIG. 4, with like elements numbered in the "500" series rather than the "400" series, and therefore includes an asset tracking device-connecting portion 526 to interface with the communication port interface of an asset tracking device, an asset-connecting portion 528 to interface with the communication port of the asset, and a cable 524 to connect the asset tracking device-connecting portion 526 to the asset-connecting portion 528. For further description of these components, reference may be had to the description of the specialized connector 400 of FIG. 4.

However, in the specialized connector 500, the asset tracking device-connecting portion 526 includes a communication port interface connector 527 to interface with the communication port interface of an asset tracking device, a first expansion port connector 523 to interface with an expansion port of the asset tracking device, and a second expansion port connector 525 to be connected to an expansion device. That is, an asset tracking device may include a communication port interface (e.g., a 16 pin connector for an OBD port) to interface with the communication port interface connector 527, and an expansion port (e.g., a Universal Serial Bus (USB) port, or similar) to interface with other devices through the expansion port connector 525 of the specialized connector 500. The asset tracking device may thereby be connected with other expansion devices which may provide additional functionality to the asset tracking device (e.g., sensors, output devices). The expansion port connectors 523, 525, may be referred to as input-output expansion (IOX) connectors.

Further, the identifying characteristic (i.e., hardware configuration) of the specialized connector 500 that identifies the specialized connector 500 may be the characteristic that one or more connection pins of the expansion port connector 523 are shorted to one or more connection pins of the communication port interface connector 527. For example, two communication pins from the expansion port connector 523 may be shorted to two unused pins of the communication port interface connector 527 (e.g., secondary CAN pins 3 and 11 according to example Table 1, above). From the perspective of the asset tracking device, the identifying characteristic (i.e., hardware configuration) of the specialized connector or specialized casing unit may appear as a shorted connection between the communication port interface of the asset tracking device and the expansion port of the asset tracking device. As with the specialized connector 400 of FIG. 400, these connection pins may be unused by the asset to which the asset tracking device is connected, and thus may be safely repurposed to provide this identifying characteristic. Further, the shorted pins may be shorted in a t-connection, thereby allowing use of the shorted connection pin(s) of the first expansion port connector 523 to communicate with an expansion device connected at the second expansion port connector 525 without disruption.

Figure 6:
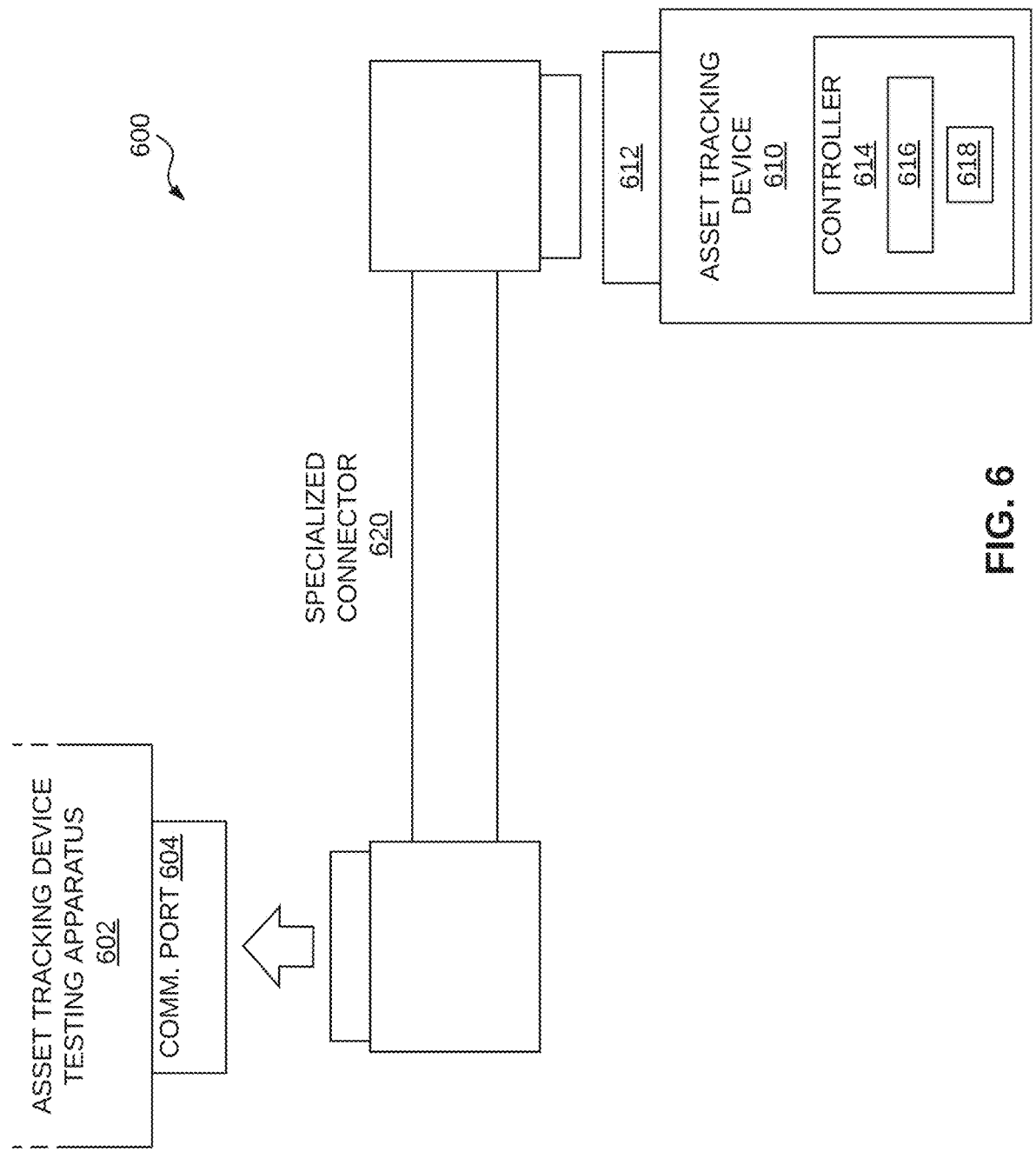
FIG. 6 is a schematic diagram of a system for modifying operation of an asset tracking device when the asset tracking device is to be interfaced with a specialized connector or casing unit.

FIG. 6 is a schematic diagram of a system 600 for modifying operation of an asset tracking device 610 when the asset tracking device 610 is to be interfaced with a specialized connector or casing unit. The system 600 may be similar to the system 100 or 200 of FIG. 2, with components numbered in the "600" series rather than the "100" or the "200" series, and therefore includes a specialized connector 620 (which may be integrated with, or embedded in, a specialized casing unit, not shown), and an asset tracking device 610 that includes and communication port interface 612 and a controller 614 that executes specialized connector detection and reconfiguration instructions 616. For further description of these components, the description of system 100 of FIG. 1 and/or system 200 of FIG. 2 may be referenced.

In contrast to the system 100 of FIG. 1 and the system 200 of FIG. 2, the system 600 includes an asset tracking device testing apparatus 602. The asset tracking device testing apparatus 602 is an example of another control unit with which the asset tracking device 610 may be interfaced. The asset tracking device testing apparatus 602 includes a communication port 604 to interface with the asset tracking device 610 directly or through the specialized connector 620. The communication port 604 may resemble an OBD port of an asset (i.e., a 16 pin connector of an OBD port) and may interface with the communication port interface 612 of the asset tracking device 610. Further, the asset tracking device testing apparatus 602 is to cooperate with the asset tracking device 610 to determine whether the asset tracking device 610 is interfaced with the asset tracking device testing apparatus 602 directly or through the specialized connector 620. When it is determined that the asset tracking device 610 is interfaced with the asset tracking device testing apparatus 602 through the specialized connector 620, the asset tracking device testing apparatus 602 causes the asset tracking device 610 (e.g., by transmitting a command) to store an indication 618 that the asset tracking device 610 is to operate in a specialized operating mode.

It may be determined that the asset tracking device 610 is interfaced with the asset tracking device testing apparatus 602 through the specialized connector 620 by any of the techniques discussed above (i.e., by detecting a hardware configuration or other identifying characteristic of the specialized connector 620 as described in FIG. 4 and FIG. 5). In some examples, the asset tracking device testing apparatus 602 may be the apparatus that controls the transmission of toggle signals through bidirectional communication lines to detect shorts of unused connection pins, as described in FIG. 4. The indication 618 may be an indication that corresponds to the type of specialized connector 620 that is used, and thus the asset tracking device 610 may be configured to operate in any of several specialized operating modes, depending on the type of specialized connector 620 through which it is interfaced.

The indication 618 may be stored on memory that is operably connected to the controller 614, such as, for example, a flash memory. The indication 618 may be stored on memory that is accessible to the controller 614 during a bootup sequence so that the controller 614 may identify the indication 618 during bootup and configure its operation accordingly. Thus, the controller 614 may determine whether the asset tracking device 610 is interfaced with the communication port of an asset, to which it is later connected, directly or through a specialized connector or specialized casing unit (i.e., is housed in a specialized casing unit), by determining, during a bootup sequence, whether the indication 618 is stored on the asset tracking device 610.

Although the asset tracking device 610 is generally capable of determining whether it is interfaced with an asset through a specialized connector 620 when it is connected to the asset, it may be safer to preprogram the asset tracking device 610 by storing an indication 618 on the asset tracking device 610 using an asset tracking device testing apparatus 602 as described herein to reduce the risk of damage to the asset caused by miscommunication between the asset tracking device 610 and the asset, such as, for example, if the asset tracking device 610 is to communicate at a different bitrate when connected to a particular asset.

FIG. 7A is a perspective view of an example specialized casing unit 700 for an asset tracking device. FIG. 7B is a perspective view of the specialized casing unit 700 with an asset tracking device 702 housed therein. The specialized casing unit 700 may be understood to be one example of the specialized casing unit 220 of FIG. 2.

The specialized casing unit 700 includes a tray 710 that forms a base for the specialized casing unit 700, and a cover (omitted here to show the interior of the tray 710). The specialized casing unit 700 further includes a communication port connector 720 to connect the asset tracking device 702, when inside the specialized casing unit 700, to a communication port of an asset. The communication port connector 720 includes an asset tracking device-connecting portion 722, a cable 724, and asset-connecting portion (not shown), which may be similar to the like components of the communication port connector 222 of FIG. 2.

The specialized casing unit 700 is to house the asset tracking device 702 and the asset tracking device-connecting portion 722 of the communication port connector 720, with the cable 724 and the asset-connecting portion (not shown) free to connect to a communication port of an asset.

Specifically, the tray 710 defines and interior space 712 to store the asset tracking device 702 and the asset tracking device-connecting portion 722 of the communication port connector 720. The tray 710 includes a sealable opening 714 to allow the cable 724 of the communication port connector 720 to pass therethrough. The sealable opening 714 is sealed when the cover (FIGS. 8A-8C, below) is fit over the tray 710, providing waterproof protection to the asset tracking device 702 and asset tracking device-connecting portion 722 housed inside the specialized casing unit 700.

Figures 8A, 8B, 8C:
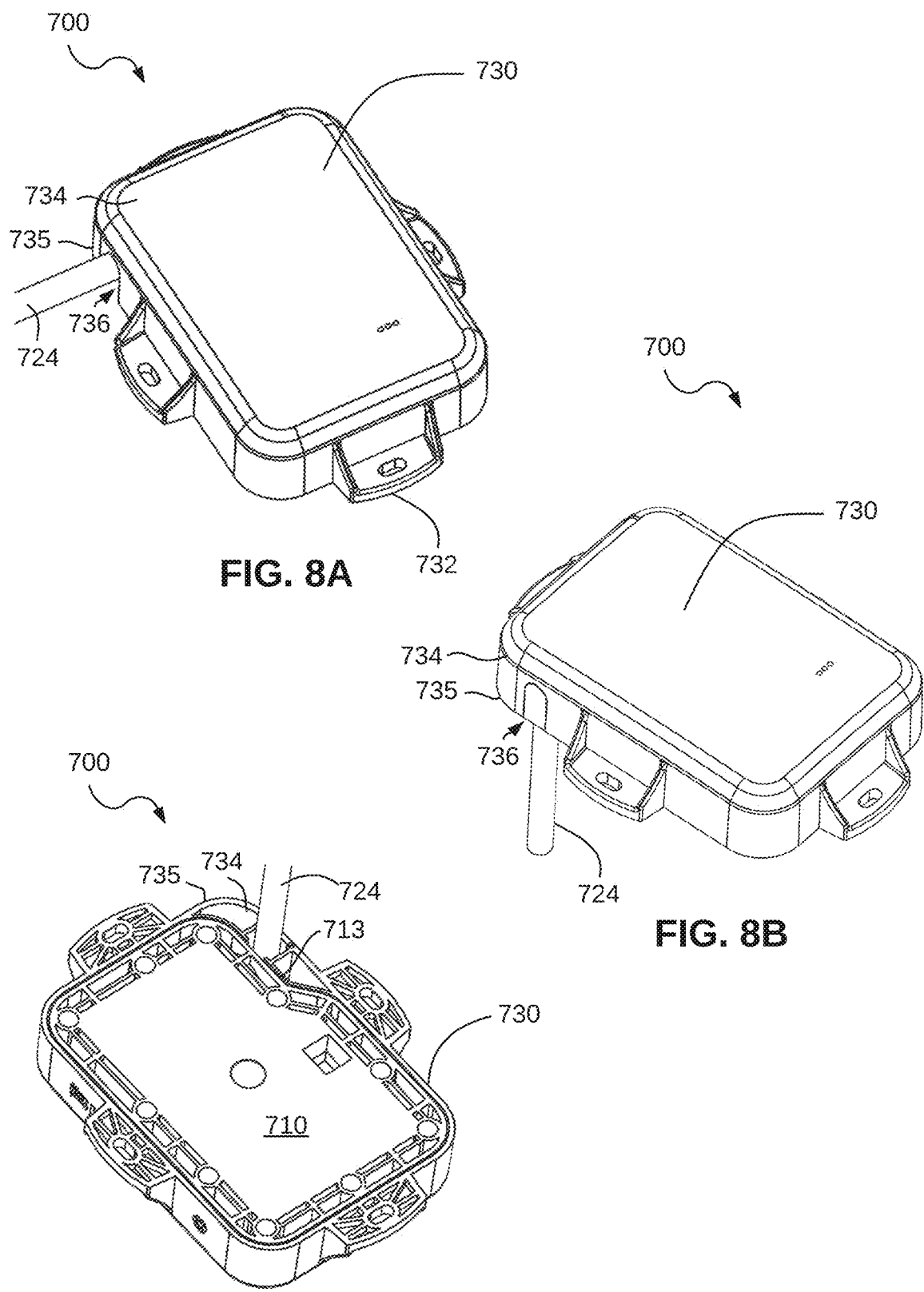
FIG. 8A is a perspective view of the specialized casing of FIG. 7A with its cover included.
FIG. 8B is another perspective view of the specialized casing unit of FIG. 7A, with the cable of its communication port connector bent downward.
FIG. 8C is another perspective view of the specialized casing unit of FIG. 7A, viewed from below, with the cable of its communication port connector travelling downward, as in FIG. 8B.

FIG. 8A is a perspective view of the specialized casing unit 700, with its cover 730 shown. The cover 730 fits over the tray 710 and is mountable to an asset by mounting tabs, flanges, or brackets 732. The cover 730 covers and closes the interior space 712 of the tray 710, and also seals the sealable opening 714 of the tray 710, when fit over the tray 710 and mounted to an asset. Mounting the cover 730 may compress a seal 715 between the tray 710 and cover 730 (see FIG. 7A) to provide a watertight enclosure within the specialized casing unit 700.

The cover 730 includes a cable routing tunnel 734 that extends past a perimeter 713 (see FIG. 7A, FIG. 8C) of the tray 710 and overhangs an area of the asset to which the cover 730 is mounted in a vicinity of the sealable opening 714. In the present example, the tray 710 includes a cutout in its perimeter 713 that leaves an area of an asset (when mounted to the asset) that is covered by the cable routing tunnel 734, but not covered by the tray 710, as can be seen comparing FIG. 7A to FIG. 8A. When the cover 730 is mounted to an asset, the cable routing tunnel 734 at least partially conceals the cable 724 as it passes through (i.e., exits through) the sealable opening 714, out from the tray 710.

The cable routing tunnel 734 includes side walls 735 that project downward toward an asset when the cover 730 is mounted to the asset. The side walls 735 define at least one opening 736 to allow the cable 724 to pass therethrough, as shown in FIG. 8A. However, since the cable routing tunnel 734 covers an area of the asset that is not covered by the tray 710, the cable routing tunnel 734 provides space to allow the cable 724 to pass directly into an asset from underneath the cover 730 without passing through the opening 736, as shown in FIG. 8B. Further, the cable routing tunnel 734 at least partially conceals the cable 724 as it passes from the sealable opening 714 into an asset in this way. The cable 724 may pass into the asset through a hole (e.g., a through hole that was drilled into the asset) located beneath the cable routing tunnel 734. FIG. 8C shows a bottom view of the cable 724 passing into an asset (not shown) from beneath the cable routing tunnel 734. The cable routing tunnel 734 may thereby optionally provide a passageway for the cable 724 to exit the specialized casing unit 700 from the side, to travel along the surface of the asset, or to exit the specialized casing unit 700 directly into the asset for greater protection of the cable 724 when the specialized casing unit 700 is mounted to the exterior of an asset.

Figure 9:
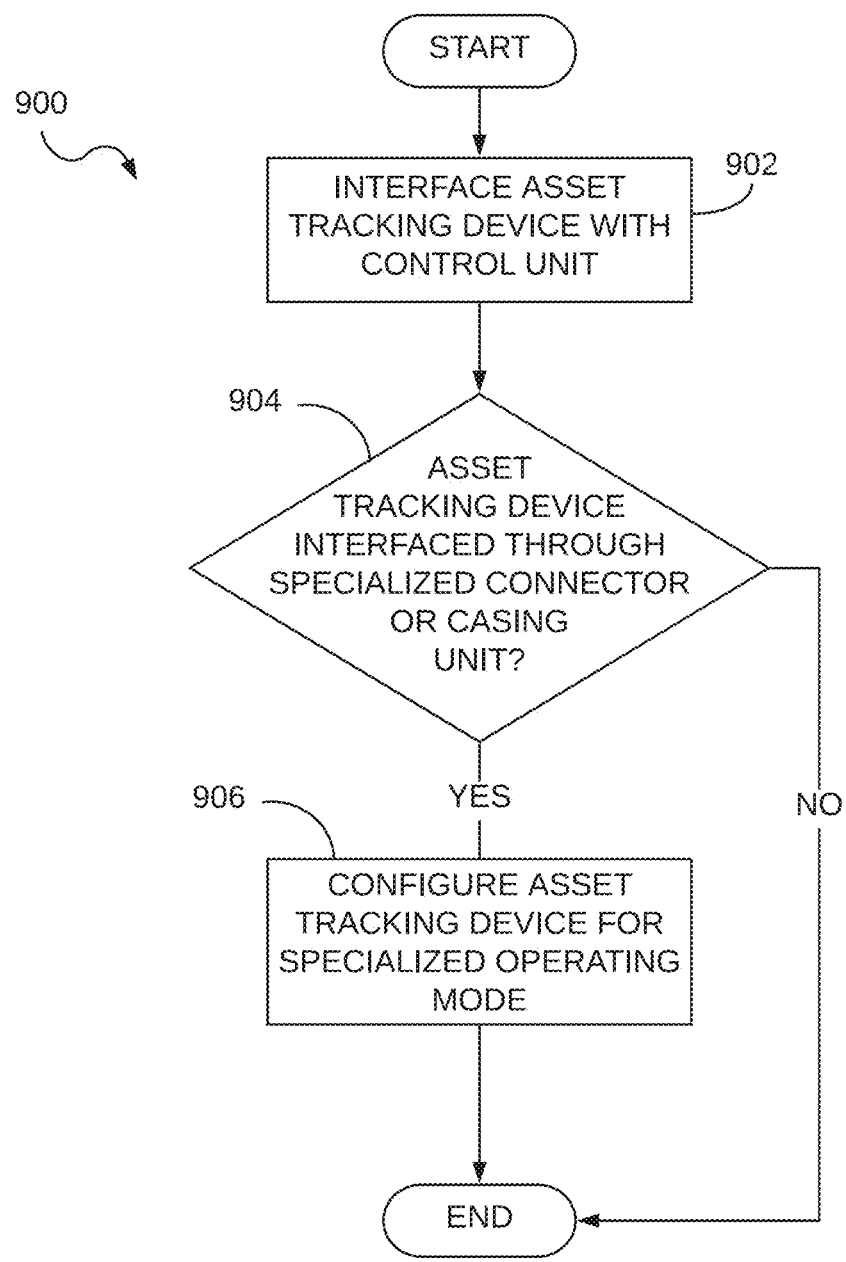
FIG. 9 is a flowchart of an example method for modifying operation of an asset tracking device when the asset tracking device is interfaced with a control unit through a specialized connector or casing unit.

FIG. 9 is a flowchart of an example method 900 for modifying operation of an asset tracking device when the asset tracking device is interfaced with a control unit through a specialized connector or casing unit. The method 900 may be understood to be one example of how the operation of the asset tracking device 300 of FIG. 3 is modified when interfaced through a specialized connector or casing unit. Thus, for convenience purposes, the method 900 is described with reference to the asset tracking device 300 of FIG. 3. Certain aspects of the blocks of the method 900 are elaborated upon above with reference to the appropriate components of the asset tracking device 300 of FIG. 3, and with reference to the system 100 of FIG. 1, and the system 200 of FIG. 2. However, it is to be understood that the method 900 may be applied to other asset tracking devices.

At block 902, the asset tracking device 300 interfaces with a control unit. In some examples, the control unit may be an electronic control unit of an asset (e.g., an electronic control unit of the asset 102 of FIG. 1 or the asset 202 of FIG. 2), with which the asset tracking device 300 is interfaced by the connection of its communication port interface 320 with a communication port of the asset. In other examples, the control unit may be an asset tracking device testing apparatus (e.g., the asset tracking device testing apparatus 602 of FIG. 6), with which the asset tracking device 300 is interfaced by the connection of its communication port interface 320 with a communication port of the asset tracking device testing apparatus.

At block 904, it is determined whether the asset tracking device 300 is interfaced with the control unit directly or through a specialized connector or specialized casing unit. The determination may be made by the asset tracking device 300 itself (e.g., via interface detection instructions 332), or in cooperation with an asset tracking device testing apparatus (e.g., as with the asset tracking device testing apparatus 602 of FIG. 6). As described above, the asset tracking device 300 may detect a specialized connector or casing by detecting an identifiable characteristic (e.g., hardware configuration) thereof.

When the asset tracking device 300 detects no specialized connector or specialized casing, the method 900 is ended. The asset tracking device 300 may configure itself for a direct connection (i.e., "normal") operating mode. When the asset tracking device 300 detects a specialized connector or specialized casing, then at block 906, the asset tracking device 300 is configured to operate in a specialized operating mode. As described above, configuring the asset tracking device 300 to operate in the specialized operating mode may involve enabling, disabling, or modifying a tracking feature, and/or setting a communication parameter.

When in the specialized operating mode, a specialized tracking feature may be enabled, and the asset tracking device 300 may proceed to collected specialized data in accordance with the specialized tracking feature and transmit the specialized data to a server that is part of a telematics system.

The method 900 may be embodied in instructions (such as the interface detection instructions 332, direct connection tracking instructions 334, and specialized tracking instructions 336) stored on a non-transitory machine-readable storage medium that is executable by the controller 330 to perform the method 900. The non-transitory machine-readable storage medium may include ROM, RAM, flash memory, magnetic storage, optical storage, and similar, or any combination thereof, for storing instructions and data as discussed herein.

Figure 10:
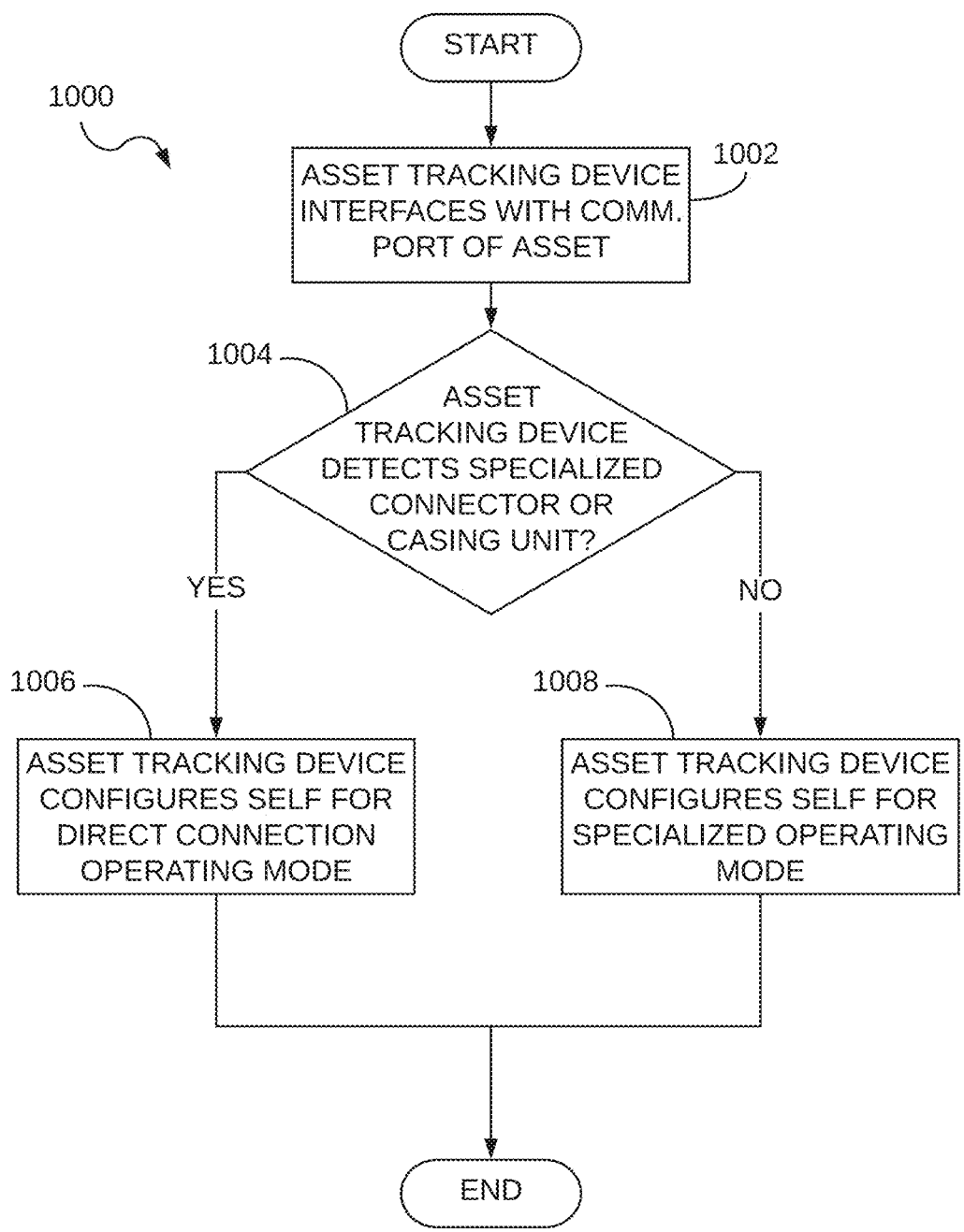
FIG. 10 is a flowchart of an example method for modifying operation of an asset tracking device when the asset tracking device is interfaced with an electronic control unit of an asset through a specialized connector or casing unit.

FIG. 10 is a flowchart of an example method 1000 for modifying operation of an asset tracking device when the asset tracking device is interfaced with an electronic control unit of an asset through a specialized connector or casing unit. The method 1000 may be understood to be one example of how the operation of the asset tracking device 300 of FIG. 3 is modified when interfaced through a specialized connector or casing unit, and in particular, an example of the method 900 when the control unit is an electronic control unit of an asset. For convenience purposes, the method 1000 is described with reference to the asset tracking device 300 of FIG. 3. Certain aspects of the blocks of the method 1000 are elaborated upon above with reference to the appropriate components of the asset tracking device 300 of FIG. 3, and with reference to the system 100 of FIG. 1, and the system 200 of FIG. 2. However, it is to be understood that the method 1000 may be applied to other asset tracking devices.

At block 1002, the asset tracking device 300 interfaces with a communication port of an asset. Interfacing with the communication port of the asset may involve establishing communication with an electronic control unit of the asset. The asset tracking device 300 may have access to the electronic control unit via the asset's communication port, and may communicate with the electronic control unit through a component of its interface layer 310 that is configured for communication with the electronic control unit.

At block 1004, the asset tracking device 300 determines whether the asset tracking device 300 detects a specialized connector or casing unit. In other words, the asset tracking device 300 determines whether it is interfaced with the communication port of the asset through a specialized connector (e.g., the specialized connector 120 of FIG. 1) or a specialized casing unit (e.g., the specialized casing unit 220 of FIG. 2). Notably, the asset tracking device 300 need not have any prior information that it is interfaced with an asset tracking device testing apparatus or an asset, as the identifying characteristic is in the specialized connector or casing unit, and thus the asset tracking device 300 may be able to detect the identifying characteristic in either case.

At block 1006, when the asset tracking device 300 detects no specialized connector or specialized casing, the asset tracking device 300 configures itself for a direct connection (i.e., "normal") operating mode.

At block 1008, when the asset tracking device 300 detects a specialized connector or specialized casing, the asset tracking device 300 configures itself to operate in a specialized operating mode. As described above, the asset tracking device 300 may detect a specialized connector or casing by detecting an identifiable characteristic (e.g., hardware configuration) thereof. Further, configuring the asset tracking device 300 to operate in the specialized operating mode may involve disabling a tracking feature that is to be disabled when the asset tracking device 300 is interfaced through a specialized connector or casing unit, enabling a tracking feature that is to be enabled when the asset tracking device 300 is interfaced through a specialized connector or casing unit, modifying a tracking feature that is to be modified when the asset tracking device 300 is interfaced through a specialized connector or casing unit, and/or setting a communication parameter that is to be set when the asset tracking device 300 is interfaced through a specialized connector or casing unit.

When in the specialized operating mode, a specialized tracking feature may be enabled, and the asset tracking device 300 may proceed to collected specialized data in accordance with the specialized tracking feature and transmit the specialized data to a server that is part of a telematics system.

The method 1000 may be embodied in instructions (such as the interface detection instructions 332, direct connection tracking instructions 334, and specialized tracking instructions 336) stored on a non-transitory machine-readable storage medium that is executable by the controller 330 to perform the method 1000. The non-transitory machine-readable storage medium may include ROM, RAM, flash memory, magnetic storage, optical storage, and similar, or any combination thereof, for storing instructions and data as discussed herein.

Figure 11:
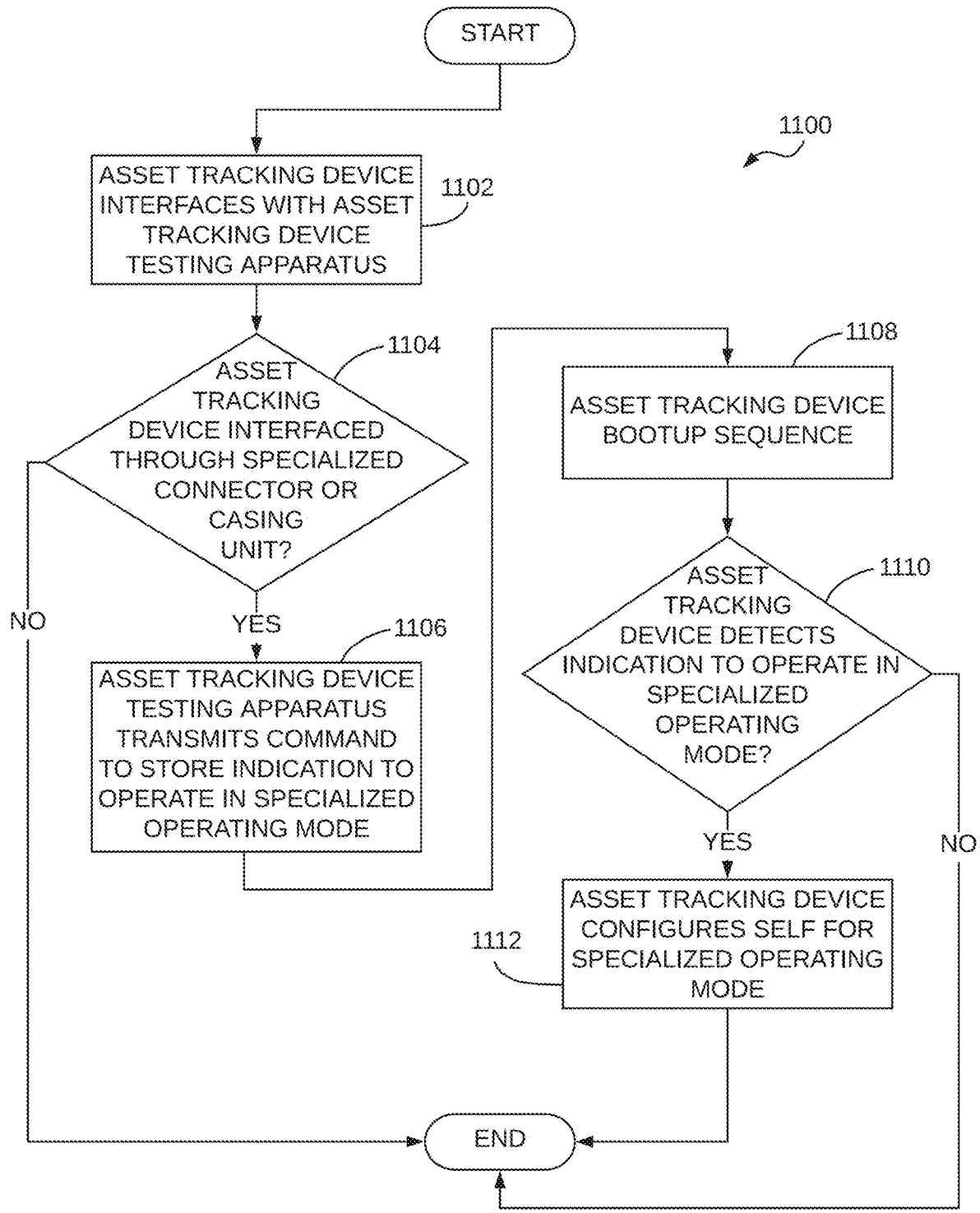
FIG. 11 is a flowchart of an example method for modifying operation of an asset tracking device when the asset tracking device is interfaced with an asset tracking device testing apparatus through a specialized connector or casing unit.

FIG. 11 is a flowchart of an example method 1100 for modifying operation of an asset tracking device when the asset tracking device is interfaced with an asset tracking device testing apparatus through a specialized connector or casing unit. The method 1100 may be understood to be one example of how the operation of the asset tracking device 300 of FIG. 3 is modified when interfaced through a specialized connector or casing unit, and in particular, an example of the method 900 when the control unit is an asset tracking device testing apparatus. For convenience purposes, the method 1100 is described with reference to the asset tracking device 300 of FIG. 3. Certain aspects of the blocks of the method 1100 are elaborated upon above with reference to the appropriate components of the asset tracking device 300 of FIG. 3, and with reference to the system 100 of FIG. 1, and the system 200 of FIG. 2. However, it is to be understood that the method 1100 may be applied to other asset tracking devices.

At block 1102, the asset tracking device 300 interfaces with an asset tracking device testing apparatus. The asset tracking device 300 interfaces with the asset tracking device apparatus (e.g., the asset tracking device testing apparatus 602 of FIG. 6) by the connection of its communication port interface 320 with a communication port of the asset tracking device testing apparatus.

At block 1104, it is determined whether the asset tracking device 300 is interfaced with the asset tracking device testing apparatus directly or through a specialized connector or specialized casing unit. The determination is made in cooperation with the asset tracking device testing apparatus. As described above, the asset tracking device 300 may detect a specialized connector or casing by detecting an identifiable characteristic (e.g., hardware configuration) thereof. Notably, the asset tracking device 300 need not have any prior information that it is interfaced with an asset tracking device testing apparatus or an asset, as the identifying characteristic is in the specialized connector or casing unit, and thus the asset tracking device 300 may be able to detect the identifying characteristic in either case.

When there is no specialized connector or specialized casing detected, the method 1100 is ended. The asset tracking device 300 may configure itself for a direct connection (i.e., "normal") operating mode.

When a specialized connector or specialized casing is detected, at block 1106, the asset tracking device testing apparatus transmits a command to the asset tracking device to store an indication that the asset tracking device is to operate in a specialized operating mode (e.g., the indication 618 of FIG. 6). The asset tracking device 300 may then be removed from the asset tracking device testing apparatus and prepared for use in the field.

In the field, at block 1108, the asset tracking device may begin a bootup sequence when it is interfaced with an asset (e.g., through its communication port). During the bootup sequence, at block 1110, the asset tracking device 300 may detect the indication that the asset tracking device 300 is to operate in the specialized operating mode.

When there is no such indication detected, the method 1100 is ended. The asset tracking device 300 may configure itself for a direct connection (i.e., "normal") operating mode.

When such an indication is detected, at block 1112, the asset tracking device 300 configures itself to operate in the specialized operating mode. As described above, configuring the asset tracking device 300 to operate in the specialized operating mode may involve enabling, disabling, or modifying a tracking feature, and/or setting a communication parameter.

When in the specialized operating mode, a specialized tracking feature may be enabled, and the asset tracking device 300 may proceed to collected specialized data in accordance with the specialized tracking feature and transmit the specialized data to a server that is part of a telematics system.

The method 1100 may be embodied in instructions (such as the interface detection instructions 332, direct connection tracking instructions 334, and specialized tracking instructions 336) stored on a non-transitory machine-readable storage medium that is executable by the controller 330 to perform the method 1100. The non-transitory machine-readable storage medium may include ROM, RAM, flash memory, magnetic storage, optical storage, and similar, or any combination thereof, for storing instructions and data as discussed herein.

Figure 12:
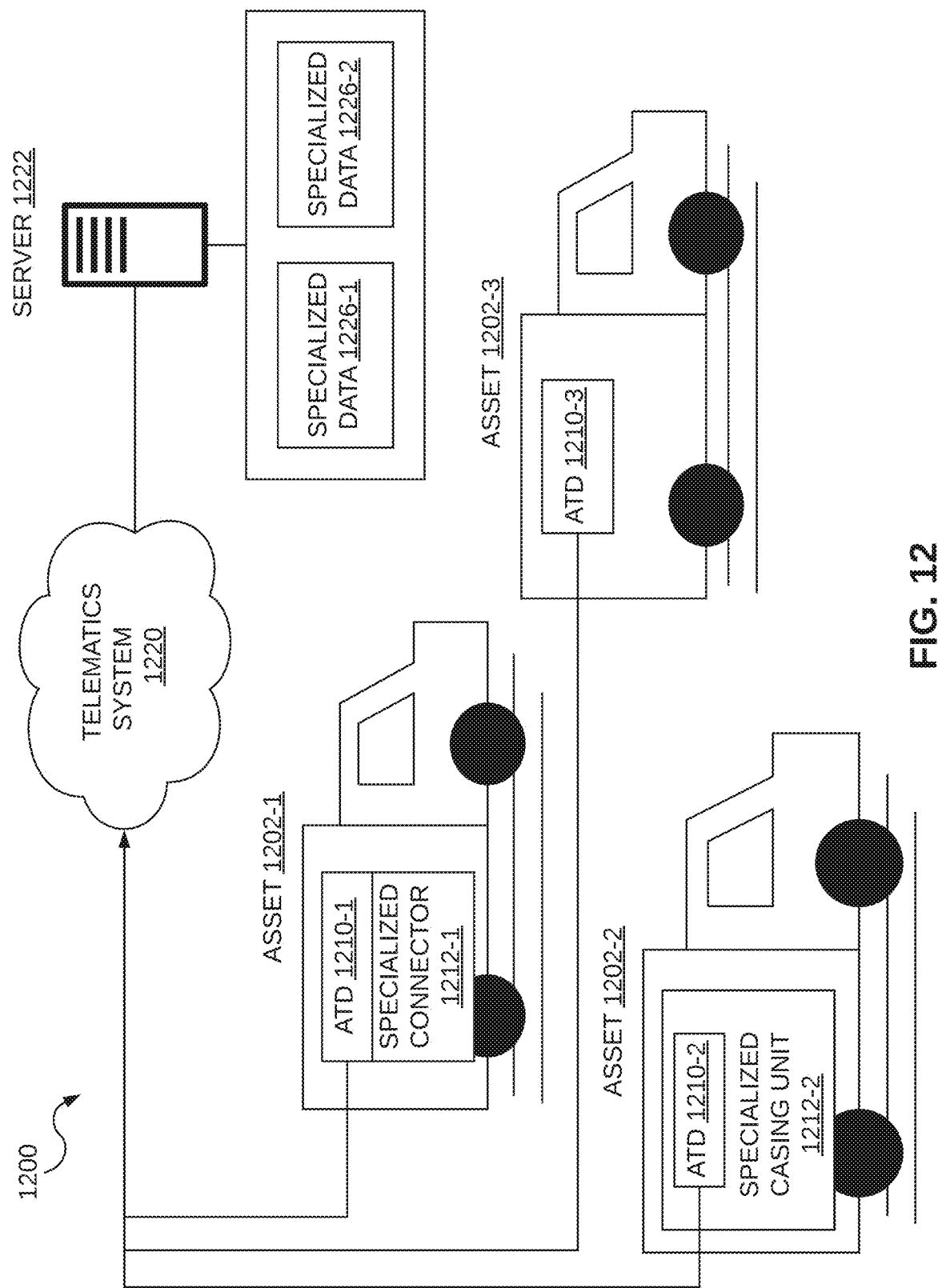
FIG. 12 is a schematic diagram of an example system for asset tracking that includes a plurality of asset tracking devices that collect data from assets through specialized connectors or casing units.

FIG. 12 is a schematic diagram of an example system 1200 for asset tracking. The system 1200 includes a plurality of asset tracking devices 1210 that collect data from assets 1202 that collect data either directly through communication ports on the assets 1202 or through specialized connectors or casing units. The assets 1212 may include passenger vehicles, transport trucks (as shown for illustrative purposes), construction equipment, electricity generators, and/or other assets.

The system 1200 further includes a telematics system 1220. The telematics system 1220 may record location data, trip/travel histories, accelerometer data, temperature sensor data, vehicle speed data, and other data captures by the asset tracking devices 1210. The telematics system 1220 may further store user accounts and other data associated with the asset tracking devices 12120 for the provision of telematics services. The telematics system 1220 includes one or more servers or computing devices, indicated, for example, as a server 1222. The server 1222 includes a network interface to communicate with the asset tracking devices 1210 via one or more computing networks and/or telecommunication networks, a memory to store data, and a controller to execute the methods performed by the telematics system 1220 as described herein.

An asset tracking device 1210 may operate in a specialized operating modes as determined by whether the asset tracking device 1210 is interfaced with an asset 1202 through a specialized connector, specialized casing unit, or directly. For example, the asset tracking device 1210-1 is interfaced with the asset 1202-1 through a specialized connector 1212-1, and therefore operates in a specialized operating mode suited to the operation of the asset 1202-1. The asset tracking device 1210-1 may have been configured to operate in its specialized operating mode by one of the techniques described herein. Similarly, the asset tracking device 1210-2 is interfaced with the asset 1202-2 through a specialized casing unit 1212-2, and therefore operates in a specialized operating mode suited to the operation of the asset 1202-2, and the asset tracking device 1210-2 may have been configured to operate in its specialized operating mode by one of the techniques described herein.

The asset tracking device 1210-3 is interfaced directly with the communication port of the asset 1202-3 without the use of a specialized connector or casing unit, and therefore operates in a "direct connection" or "normal" operating mode.

The server 1222 records data collected from the asset tracking devices 1210, including, in the case of the asset tracking device 1210-1, specialized data 1226-1 in accordance with a specialized tracking feature that may be enabled in the specialized operating mode that the asset tracking device 1210-1 is engaged in. Similarly, the server 1222 records specialized data 1226-2 in accordance with specialized tracking feature that may be enabled in the specialized operating mode that the asset tracking device 1210-2 is engaged in. The specialized data 1226-1 and 1226-2 may be different depending on the specialized operating modes being executed by the asset tracking devices 1210-1 and 1210-2. For example, the asset 1202-1 may be construction vehicle, and the specialized data 1226-1 may include sensor data that is particular to that kind of construction vehicle. Similarly, the asset 1202-2 may be a sports recreation vehicle, such as a snowmobile or all-terrain vehicle (ATV), and the specialized data 1226-1 may include sensor data that that is particular to that type of vehicle.

While some asset tracking devices 1210 may be configured to operate in a specialized operating mode by the detection of a specialized connector or specialized casing as described herein, some of the asset tracking devices 1210 may be configured to operate in a specialized operating mode by a command transmitted from the server 1222. For example, the server 1222 may transmit a command to an asset tracking device 1210 to store an indication that the asset tracking device 1210 is to operate in a specialized operating mode, and upon reboot, the asset tracking device 1210 may detect the indication and reconfigure itself to operate in the specialized operating mode. It may be useful to be able to configure an asset tracking device 1210 to operate in a specialized operating mode remotely from the server 1222 so that an owner or operator of the asset 1202 may procure a specialized connector or specialized casing unit that is not necessarily configured with an identifying characteristic, and still be able to have the asset tracking device 1210 operate in the specialized operating mode and to collect specialized data.

Thus, a self-contained asset tracking device may be capable of interfacing with the asset directly or through a specialized connector or casing unit. The specialized connector or casing unit may provide protection or other features that enable the asset tracking device to conduct its tracking more safely, effectively, or conveniently. Further, the presence of the specialized connector or casing unit may cause the asset tracking device to modify its operation in a manner that is better suited for tracking the particular asset that it is tracking. The asset tracking device may intelligently recognize that it is interfaced with the asset through a specialized connector or casing unit by detecting an identifiable characteristic of the specialized connector or casing unit, and reconfigure itself accordingly. The characteristic-identification process may be performed prior to the asset tracking device entering the field, as aided by an asset tracking device testing apparatus, to reduce the risk that a naive asset tracking device may miscommunicate with an asset while it attempts to determine whether it should operate in a specialized operating mode.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A system comprising:
an asset tracking device; and
a specialized casing unit to house the asset tracking device and to connect the asset tracking device to a communication port of an asset;
wherein the asset tracking device comprises:
a communication port interface to:
interface with the communication port of the asset directly; and
interface with the communication port of the asset through the specialized casing unit; and
a controller to:
determine whether the asset tracking device is interfaced with the communication port of the asset directly or through the specialized casing unit; and
when it is determined that the asset tracking device is interfaced with the communication port of the asset through the specialized casing unit, configure the asset tracking device to operate in a specialized operating mode;
wherein the specialized casing unit comprises:
a communication port connector to connect the asset tracking device to the communication port of the asset, the communication port connector including:
an asset tracking device-connecting portion to interface with the communication port interface of the asset tracking device,
an asset-connecting portion to interface with the communication port of the asset, and
a cable to connect the asset tracking device-connecting portion to the asset-connecting portion; and
a casing to house the asset tracking device and the asset tracking device-connecting portion of the communication port connector with the cable and the asset-connecting portion free to connect to the communication port of the asset.

2. The system of claim 1, wherein the controller determines whether the asset tracking device is interfaced with the communication port of the asset directly or through the specialized casing unit by detecting an identifying characteristic of the specialized casing unit.

3. The system of claim 1, wherein the casing is waterproof.

4. The system of claim 1, wherein the asset tracking device-connecting portion of the communication port connector matches a form factor and connection pin arrangement of the communication port of the asset.

5. The system of claim 1, wherein the casing includes:
a tray that defines an interior space to store the asset tracking device and the asset tracking device-connecting portion of the communication port connector, the tray including a sealable opening to allow the cable of the communication port connector to pass therethrough; and
a cover that fits over the tray and is mountable to the asset, the cover to close the interior space of the tray and seal the sealable opening of the tray when fit over the tray and mounted to the asset, the cover including a cable routing tunnel that extends past a perimeter of the tray and overhangs an area of the asset in a vicinity of the sealable opening to at least partially conceal the cable as it passes through the sealable opening, the cable routing tunnel further to at least partially conceal the cable as it passes from the sealable opening into the asset through a hole in the asset located beneath the cable routing tunnel.

6. The system of claim 1, wherein the controller determines whether the asset tracking device is interfaced with the communication port of the asset directly or through the specialized casing unit by detecting an identifying characteristic of the asset tracking device-connecting portion of the communication port connector.

7. The system of claim 6, wherein the identifying characteristic of the asset tracking device-connecting portion of the communication port connector is the characteristic that two connection pins of the asset tracking device-connecting portion of the communication port connector are shorted together.

8. The system of claim 6, wherein:
the asset tracking device includes an expansion port;
the asset tracking device-connecting portion of the communication port connector includes:
  a communication port interface connector to interface with the communication port interface of the asset tracking device, and
  an expansion port connector to interface with the expansion port of the asset tracking device; and
the identifying characteristic of the asset tracking device-connecting portion of the communication port connector is the characteristic that one or more connection pins of the expansion port connector are shorted to one or more connection pins of the communication port interface connector.

9. The system of claim 1, wherein the controller is to configure the asset tracking device to operate in the specialized operating mode by one or more of:
disabling a tracking feature that is to be disabled when the asset tracking device is housed in the specialized casing unit;
enabling a tracking feature that is to be enabled when the asset tracking device is housed in the specialized casing unit;
modifying a tracking feature that is to be modified when the asset tracking device is housed in the specialized casing unit; and
setting a communication parameter that is to be set when the asset tracking device is housed in the specialized casing unit.

10. The system of claim 1, wherein:
the system further comprises an asset tracking device testing apparatus to:
  interface with the asset tracking device,
  cooperate with the asset tracking device to determine whether the asset tracking device is interfaced with the asset tracking device testing apparatus directly or through the specialized casing unit, and
  when it is determined that the asset tracking device is interfaced with the asset tracking device testing apparatus through the specialized casing unit, cause the asset tracking device to store an indication that the asset tracking device is to operate in the specialized operating mode; and
the controller of the asset tracking device determines whether the asset tracking device is interfaced with the communication port of the asset directly or through the specialized casing unit by the asset tracking device determining, during a bootup sequence, whether the indication that the asset tracking device is to operate in the specialized operating mode is stored on the asset tracking device.

11. An asset tracking device comprising:
an interface layer to collect data through a communication port of an asset; and
a controller to:
  determine whether the asset tracking device is housed in a specialized casing unit, the specialized casing unit including a communication port connector to connect the interface layer of the asset tracking device to the communication port of the asset; and
  when it is determined that the asset tracking device is housed in the specialized casing unit, configure the asset tracking device to operate in a specialized operating mode; and
a network interface to transmit the data collected through the interface layer to a server;
wherein the communication port connector of the specialized casing comprises:
  a communication port connector to connect the asset tracking device to the communication port of the asset, the communication port connector including:
    an asset tracking device-connecting portion to interface with the communication port interface of the asset tracking device,
    an asset-connecting portion to interface with the communication port of the asset, and
    a cable to connect the asset tracking device-connecting portion to the asset-connecting portion; and
  a casing to house the asset tracking device and the asset tracking device-connecting portion of the communication port connector with the cable and the asset-connecting portion free to connect to the communication port of the asset.

12. The asset tracking device of claim 11, wherein the controller determines whether the asset tracking device is housed in the specialized casing unit by detecting a hardware configuration of the specialized casing unit.

13. The asset tracking device of claim 12, wherein:
asset tracking device includes:
  a communication port interface to interface with the communication port of the asset directly and to interface with the communication port of the asset through the specialized casing unit, and
  an expansion port, and
the hardware configuration of the specialized casing unit comprises a shorted connection between the communication port interface of the asset tracking device and the expansion port of the asset tracking device.

14. The asset tracking device of claim 11, wherein the controller determines whether the asset tracking device is housed in the specialized casing unit by determining whether an indication that the asset tracking device is to operate in the specialized operating mode is stored on the asset tracking device.

15. The asset tracking device of claim 11, wherein the controller is to configure the asset tracking device to operate in the specialized operating mode by one or more of:
disabling a tracking feature that is to be disabled when the asset tracking device is housed in the specialized casing unit;

enabling a tracking feature that is to be enabled when the asset tracking device is housed in the specialized casing unit;

modifying a tracking feature that is to be modified when the asset tracking device is housed in the specialized casing unit; and setting a communication parameter that is to be set when the asset tracking device is housed in the specialized casing unit.

16. A method comprising:

interfacing an asset tracking device with a control unit;

determining whether the asset tracking device is interfaced with the control unit directly or through a specialized casing unit, the specialized casing unit comprises:
- a communication port connector to connect the asset tracking device to the communication port of the asset, the communication port connector including:
  - an asset tracking device-connecting portion to interface with the communication port interface of the asset tracking device,
  - an asset-connecting portion to interface with the communication port of the asset, and
  - a cable to connect the asset tracking device-connecting portion to the asset-connecting portion; and
- a casing to house the asset tracking device and the asset tracking device-connecting portion of the communication port connector with the cable and the asset-connecting portion free to connect to the communication port of the asset; and when it is determined that the asset tracking device is interfaced with the control unit through the specialized casing unit, configuring the asset tracking device to operate in a specialized operating mode.

17. The method of claim 16, wherein the control unit comprises an electronic control unit of an asset.

18. The method of claim 16, wherein:

the control unit comprises an asset tracking device testing apparatus;

determining whether the asset tracking device is interfaced with the control unit directly or through the specialized casing unit comprises the asset tracking device testing apparatus cooperating with the asset tracking device; and configuring the asset tracking device to operate in the specialized operating mode comprises:
- the asset tracking device testing apparatus transmitting a command to the asset tracking device to store an indication that the asset tracking device is to operate in the specialized operating mode,
- the asset tracking device initializing a bootup sequence;
- the asset tracking device detecting, during the bootup sequence, the indication that the asset tracking device is to operate in the specialized operating mode; and
- the asset tracking device configuring itself to operate in the specialized operating mode.

19. The method of claim 18, wherein a specialized tracking feature is enabled in the specialized operating mode, and the method further comprises:

the asset tracking device collecting specialized data in accordance with the specialized tracking feature; and the asset tracking device transmitting the specialized data to a server.

* * * * *